(12) United States Patent
Kaehler

(10) Patent No.: US 10,565,790 B2
(45) Date of Patent: Feb. 18, 2020

(54) PERIOCULAR AND AUDIO SYNTHESIS OF A FULL FACE IMAGE

(71) Applicant: Magic Leap, Inc., Plantation, FL (US)

(72) Inventor: Adrian Kaehler, Los Angeles, CA (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 15/808,516

(22) Filed: Nov. 9, 2017

(65) Prior Publication Data

US 2018/0137678 A1  May 17, 2018

Related U.S. Application Data

(60) Provisional application No. 62/421,033, filed on Nov. 11, 2016.

(51) Int. Cl.
| | |
|---|---|
| *G06T 17/20* | (2006.01) |
| *G10L 21/10* | (2013.01) |
| *G06T 13/40* | (2011.01) |
| *G06K 9/00* | (2006.01) |
| *G02B 27/00* | (2006.01) |
| *G02B 27/01* | (2006.01) |

(52) U.S. Cl.
CPC .......... *G06T 17/20* (2013.01); *G02B 27/0093* (2013.01); *G02B 27/0172* (2013.01); *G06K 9/0061* (2013.01); *G06K 9/00275* (2013.01); *G06K 9/00281* (2013.01); *G06T 13/40* (2013.01); *G10L 21/10* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 6,850,221 | B1 | 2/2005 | Tickle |
| 7,020,305 | B2 | 3/2006 | Liu et al. |
| 7,133,048 | B2 | 11/2006 | Brand |
| 8,950,867 | B2 | 2/2015 | Macnamara |
| 9,001,118 | B2 | 4/2015 | Molyneaux et al. |

(Continued)

FOREIGN PATENT DOCUMENTS

WO  WO 2016/089691  5/2019

OTHER PUBLICATIONS

Thies et al., "FaceVR: Real-Time Facial Reenactment and Eye Gaze Control in Virtual Reality", Oct. 2016. (Year: 2016).*

(Continued)

*Primary Examiner* — Nicholas R Wilson
(74) *Attorney, Agent, or Firm* — Knobbe, Martens, Olson & Bear, LLP

(57) ABSTRACT

Systems and methods for synthesizing an image of the face by a head-mounted device (HMD) are disclosed. The HMD may not be able to observe a portion of the face. The systems and methods described herein can generate a mapping from a conformation of the portion of the face that is not imaged to a conformation of the portion of the face observed. The HMD can receive an image of a portion of the face and use the mapping to determine a conformation of the portion of the face that is not observed. The HMD can combine the observed and unobserved portions to synthesize a full face image.

23 Claims, 18 Drawing Sheets

(56) References Cited

U.S. PATENT DOCUMENTS

| | | |
|---|---|---|
| 9,215,293 B2 | 12/2015 | Miller |
| 9,310,559 B2 | 4/2016 | Macnamara |
| 9,348,143 B2 | 5/2016 | Gao et al. |
| D758,367 S | 6/2016 | Natsume |
| 9,417,452 B2 | 6/2016 | Schowengerdt et al. |
| 9,470,906 B2 | 10/2016 | Kaji et al. |
| 9,479,736 B1 | 10/2016 | Karakotsios |
| 9,547,174 B2 | 1/2017 | Gao et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 2006/0009978 A1 | 1/2006 | Ma et al. |
| 2012/0127062 A1 | 5/2012 | Bar-Zeev et al. |
| 2013/0082922 A1 | 4/2013 | Miller |
| 2013/0125027 A1 | 5/2013 | Abovitz |
| 2014/0003762 A1 | 1/2014 | Macnamara |
| 2014/0071539 A1 | 3/2014 | Gao |
| 2014/0177023 A1 | 6/2014 | Gao et al. |
| 2014/0218468 A1 | 8/2014 | Gao et al. |
| 2014/0278403 A1 | 9/2014 | Jacob et al. |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0326570 A1 | 11/2015 | Publicover et al. |
| 2015/0346490 A1 | 12/2015 | Tekolste et al. |
| 2015/0346495 A1 | 12/2015 | Welch et al. |
| 2015/0356781 A1 | 12/2015 | Miller |
| 2016/0011419 A1 | 1/2016 | Gao |
| 2016/0026253 A1 | 1/2016 | Bradski et al. |

OTHER PUBLICATIONS

Blanz et al., "A Morphable Model for The Synthesis of 3D Faces", SIGGRAPH, 1999. (Year: 1999).*

Blanz, V. et al.: "A Morphable Model for the Synthesis of 3D Faces," International Conference on Computer Graphics and Interactive Techniques, Aug. 1999, in 8 pages.

Liu Z. et al., "Rapid Modeling of Animated Faces From Video", Computer Anim Virtual Worlds (Sep. 2001) 12(4): 227-240.

Liu Z. et al., "Face Geometry and Appearance Modeling: Concepts and Applications," Cambridge University Press, Apr. 2011, in 172 pages (uploaded in two parts).

Visser, M. et al.: "Classifying Visemes for Automatic Lipreading," Springer Verlag Berlin/Heidelberg in Proceedings of the Second International Workshop on Text, Speech and Dialogue (Sep. 1999) pp. 349-852.

Vlasic, D. et al.: "Face Transfer with Multilinear Models," Proceedings of the International Conference on Computer Graphics and Interactive Techniques, Jul. 2006, in 8 pages.

Zhang Z. et al., "Robust and Rapid Generation of Animated Faces from Video Images: A Model-Based Modeling Approach", Inter'l J Comp Vision (Jun. 2004) 58(1): 93-119.

International Search Report and Written Opinion for PCT Application No. PCT/US2017/60942, dated Jan. 17, 2018.

International Preliminary Report on Patentability for PCT Application No. PCT/US2017/060942, dated May 14, 2019.

* cited by examiner

US 10,565,790 B2

PERIOCULAR AND AUDIO SYNTHESIS OF A FULL FACE IMAGE

CROSS-REFERENCE TO RELATED APPLICATIONS

This application claims the benefit of priority under 35 U.S.C. § 119(e) to U.S. Provisional Application No. 62/421,033, filed on Nov. 11, 2016, entitled "PERIOCULAR AND AUDIO SYNTHESIS OF A FULL FACE IMAGE," the disclosure of which is hereby incorporated by reference herein in its entirety.

FIELD

The present disclosure relates to mixed reality imaging and visualization systems and more particularly to synthesis and generation of a face image using audio data and periocular images.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Systems and methods for synthesizing an image of the face by a head-mounted device (HMD) are disclosed. The HMD may not be able to observe a portion of the face. The systems and methods described herein can generate a mapping from a conformation of the portion of the face that is not imaged to a conformation of the portion of the face observed. The HMD can receive an image of a portion of the face and use the mapping to determine a conformation of the portion of the face that is not observed. The HMD can combine the observed and unobserved portions to synthesize a full face image.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
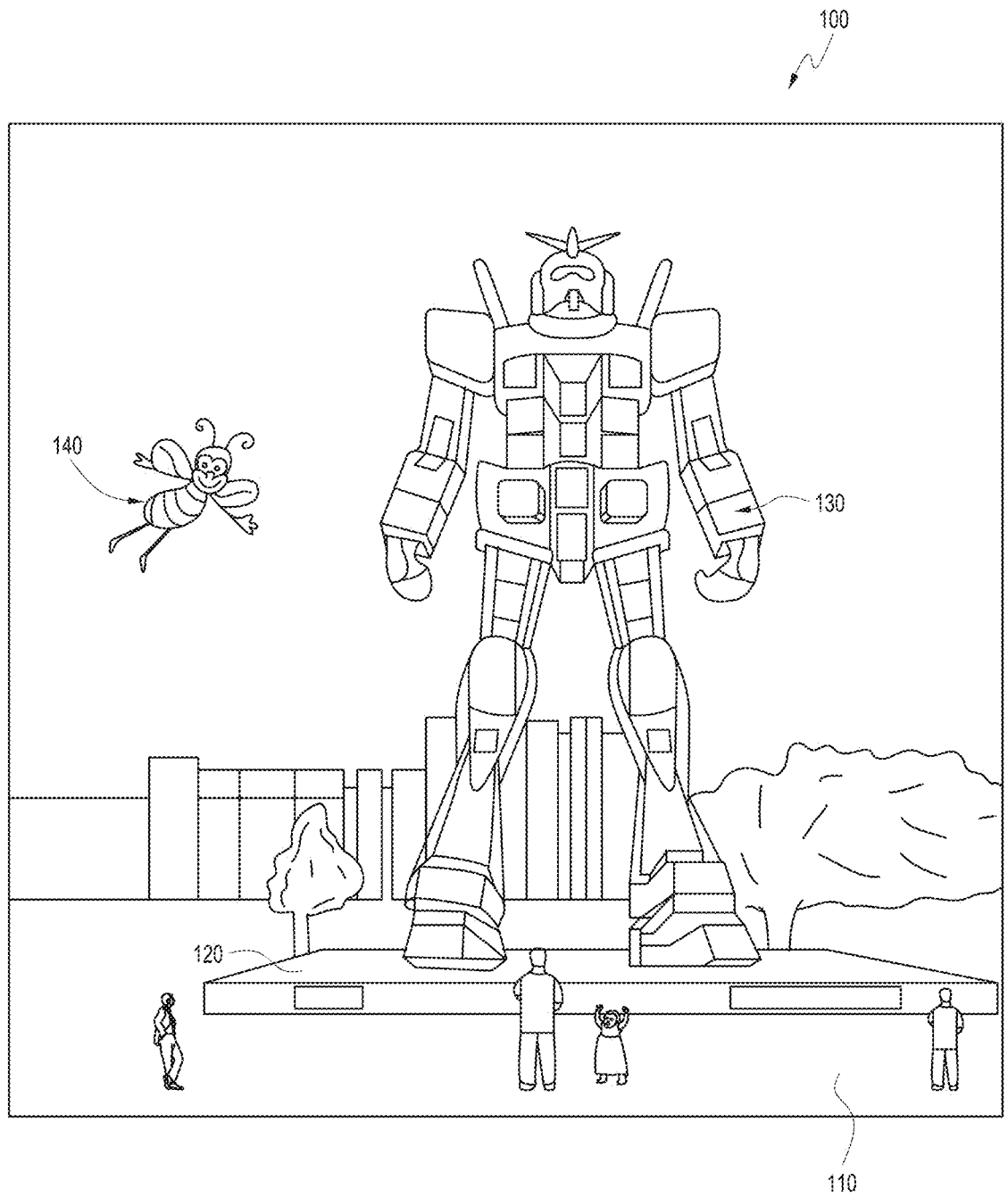
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

In an AR/VR/MR environment, a wearable device (such as a head-mounted device) can present a virtual image in a three-dimensional (3D) space. The virtual image may include a 3D virtual avatar of a user. The 3D virtual avatar may be generated using an image of the user's face. However, when a user is wearing a wearable device, a portion of the face (e.g., the periocular region surrounding the eyes) may be occluded by the wearable device. For example, if the image is obtained using an external camera or an outward-facing imaging system, movements of the periocular region (e.g., eye or skin movements) may not be imaged. As another example, if the image is obtained using an inward-facing eye camera, the lower face region may not be imaged by the eye camera. As a result, it may be difficult to update the 3D avatar of the user's face to include the user's facial expressions (such as when the user is speaking) while the user is wearable the wearable device.

The systems and methods described herein are directed to solving at least this challenge by deducing appearance of an unobservable region of the face using the images of a region of the face that can be observed by the camera. The wearable device can synthesize a full face image using the imaged region and the deduced region. The wearable device can deduce the unobservable region using a mapping between an observable conformation of the periocular region and a deduced conformation of the lower face. The mapping may be generated using inputs such as sounds made by the user (e.g., phonemes in the user's speech), facial conformations corresponding to the sounds (e.g., visemes associated with the phoneme), images of the user's periocular region, or the observed images of the lower face, alone or in combination. The conformations may include face parameters in a face model, features of the user's face, or images generated for the user's face, etc. While the user is speaking, the wearable device can sense the audio output, identify phonemes, and deduce visemes using a mapping from the sensed phonemes in the audio input to the corresponding visemes.

The observed images may be combined with the deduced images to generate a full face image. The full face image may be used to dynamically update the user's virtual avatar in an AR/VR/MR experience. A deformable linear model (DLM) (or other shape or texture model) for the face or a neural network can be used to determine, train, or apply the mapping.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
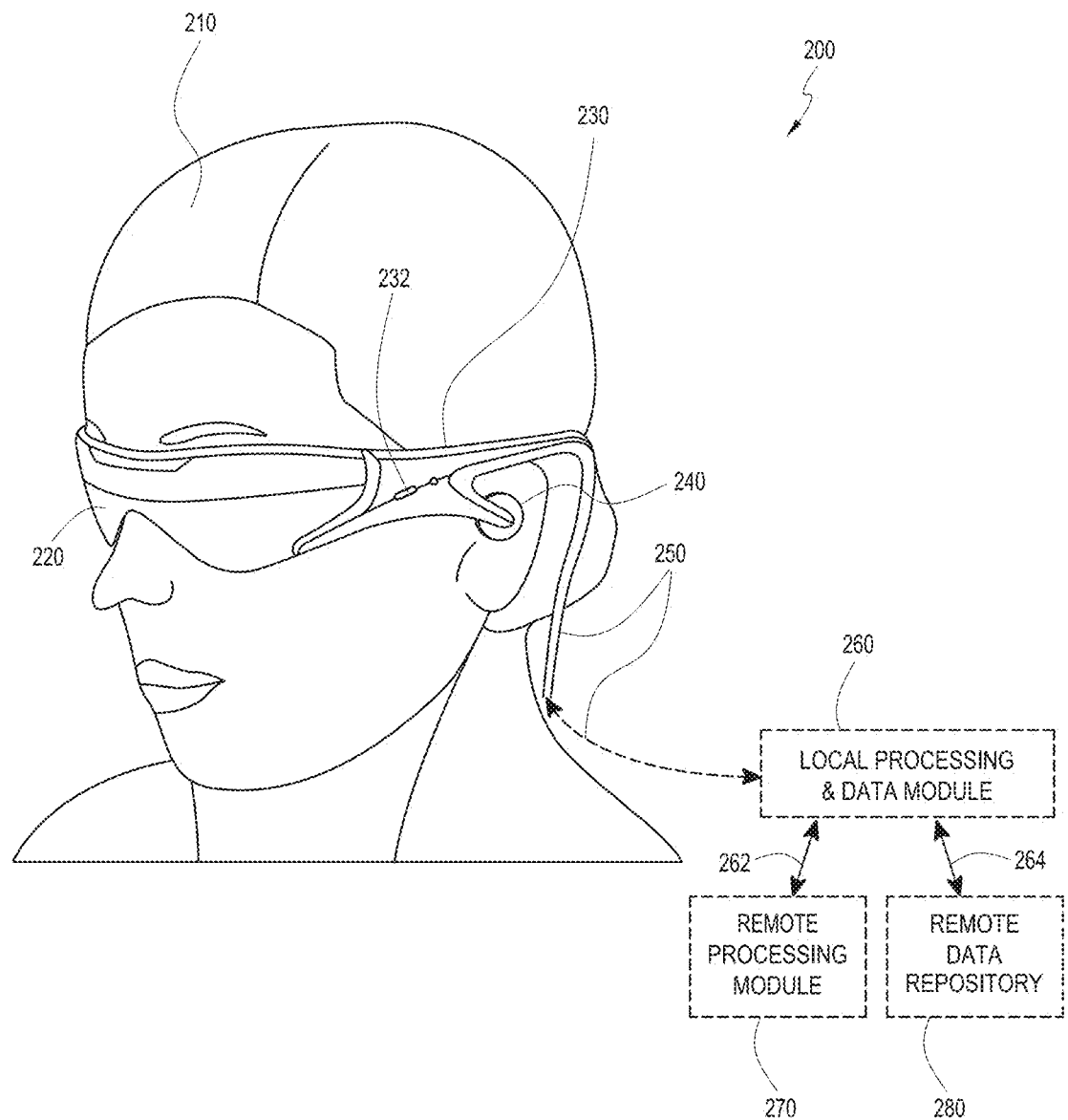
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. The head mounted display may be a heads-up display (HUD) which can display virtual information in pre-determined locations within a field of view of the user (as perceived through the HUD). The head-mounted display may also be a spatial augmented reality (SAR) display which can render 3D objects into the user's environment in a perspective correct manner (e.g., from the perspective of the user) such that the virtual objects appear similar to the real world objects. The perspective used for rendering the virtual objects may also be referred to as rendering viewpoint.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye. As another example, the pupil diameter or orientation of only one eye is determined (e.g., based on images acquired for a camera configured to acquire the images of that eye) and the eye features determined for this eye are assumed to be similar for the other eye of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
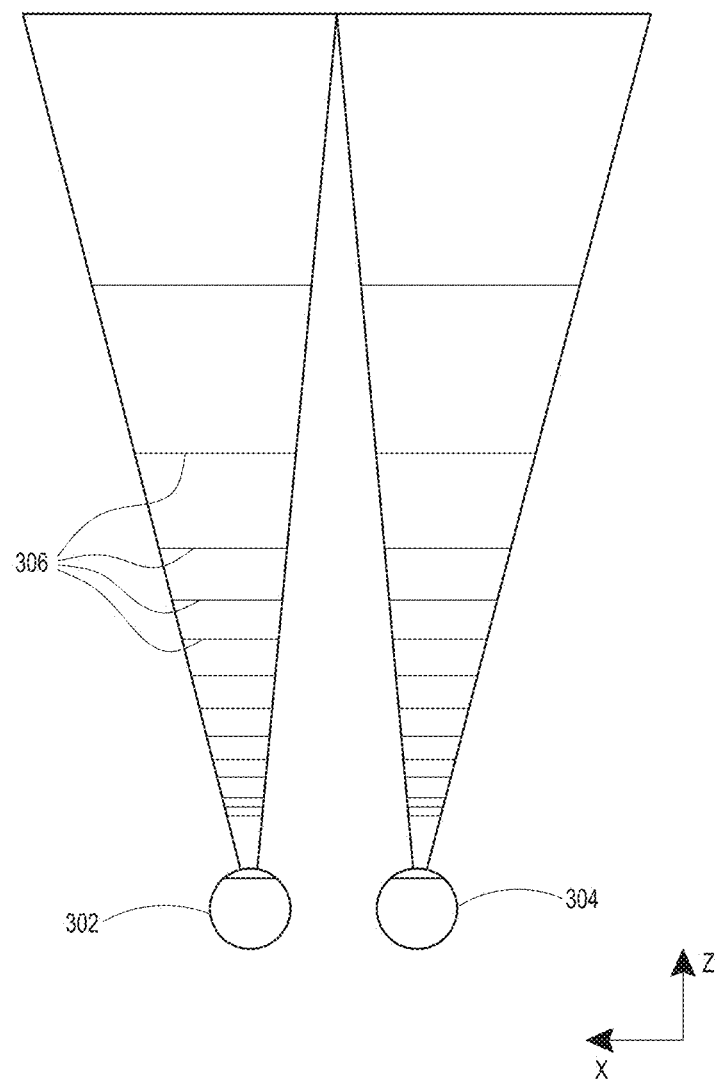
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
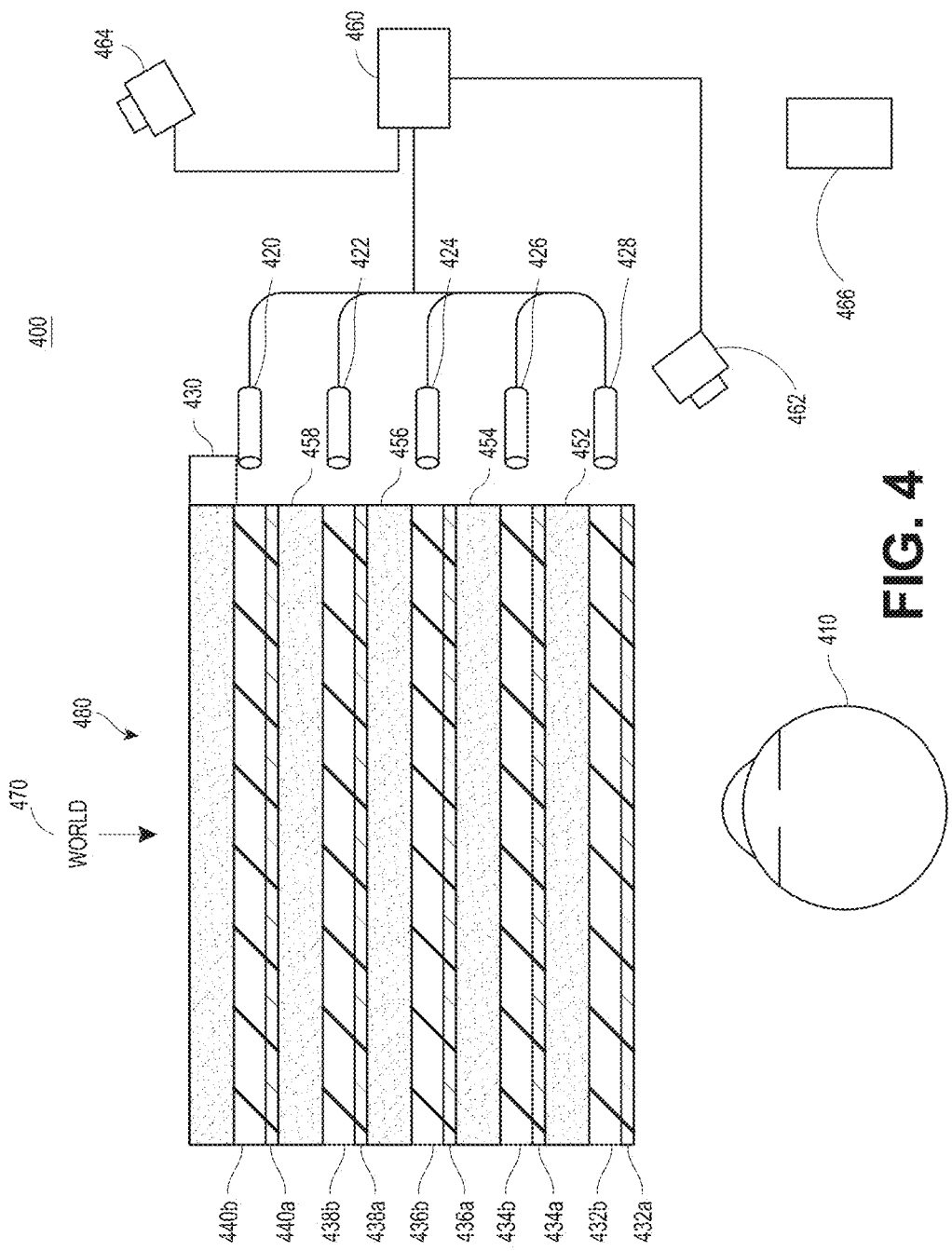
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410 (which may correspond to the eye 304 in FIG. 3). Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
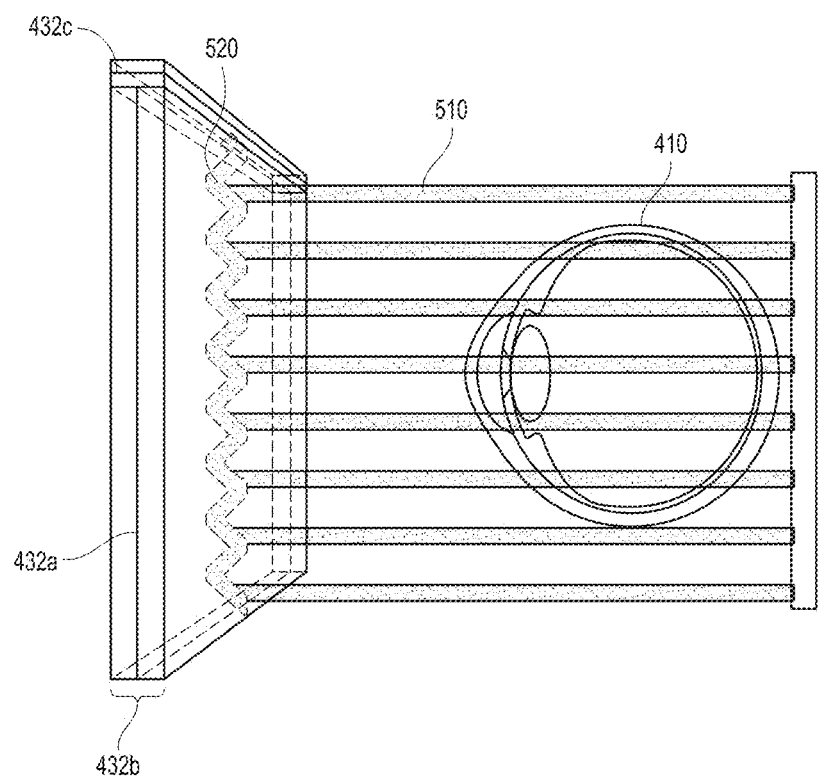
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432*b* at the input edge 432*c* of the waveguide 432*b* and propagates within the waveguide 432*b* by TIR. At points where the light 520 impinges on the DOE 432*a*, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432*b*. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
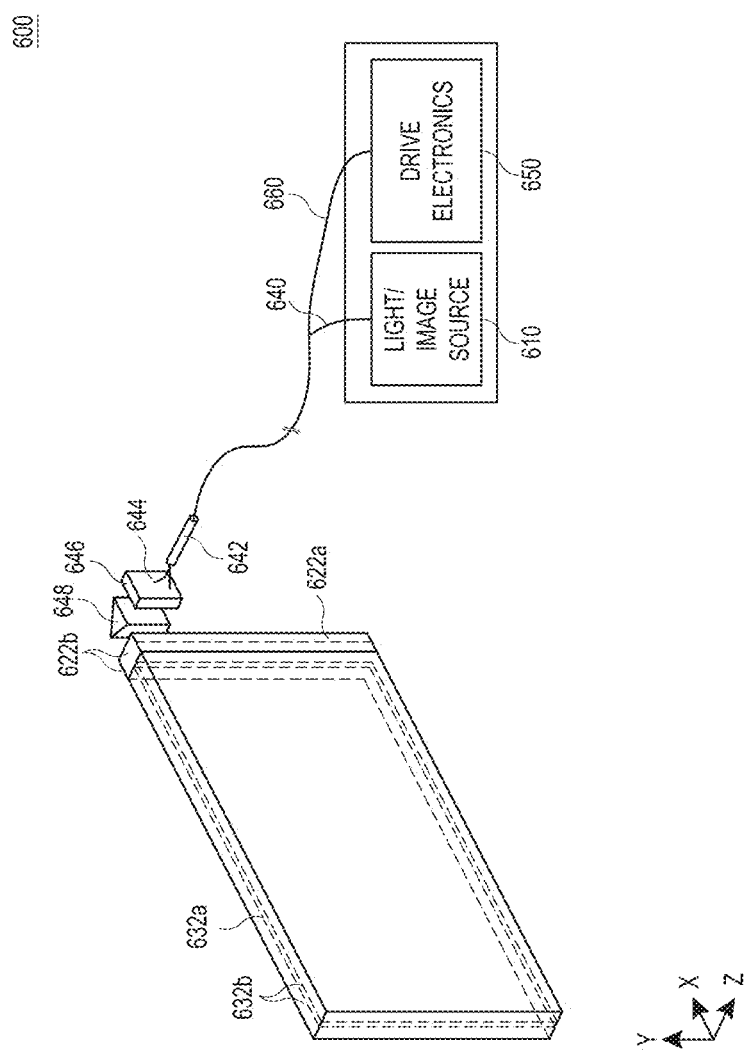
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632*a* (only one is shown in FIG. 6) and one or more DOEs 632*b* associated with each of at least some of the primary waveguides 632*a*. The planar waveguides 632*b* can be similar to the waveguides 432*b*, 434*b*, 436*b*, 438*b*, 440*b* discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622*b* and at least one DOE 622*a* (illustrated by double dash-dot line) associated with the distribution planar waveguide 622*b*. The distribution planar waveguide 622*b* may be similar or identical in at least some respects to the primary planar waveguide 632*b*, having a different orientation therefrom. Likewise, at least one DOE 622*a* may be similar to or identical in at least some respects to the DOE 632*a*. For example, the distribution planar waveguide 622*b* or DOE 622*a* may be comprised of the same materials as the primary planar waveguide 632*b* or DOE 632*a*, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632*b*. The primary planar waveguide 632*b* can relay light along a second axis, preferably orthogonal to first axis (e.g., horizontal or X-axis in view of FIG. 6). Notably, the second axis can be a non-orthogonal axis to the first axis. The primary planar waveguide 632*b* expands the light's effective exit pupil along that second axis (e.g., X-axis). For example, the distribution planar waveguide 622*b* can relay and expand light along the vertical or Y-axis, and pass that light to the primary planar waveguide 632*b* which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622*b* which contains the at least one diffractive optical element (DOE) 622*a*. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
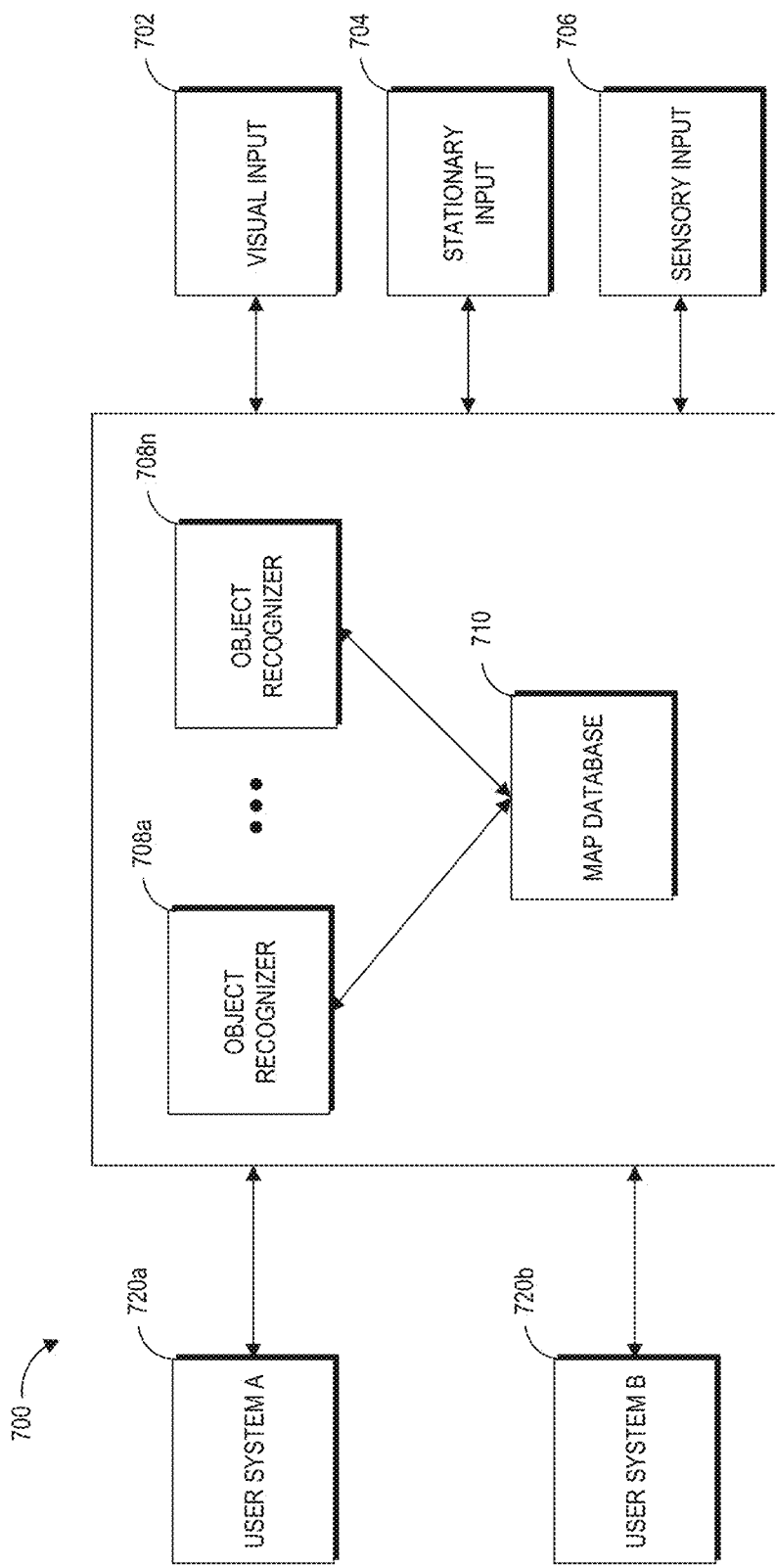
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
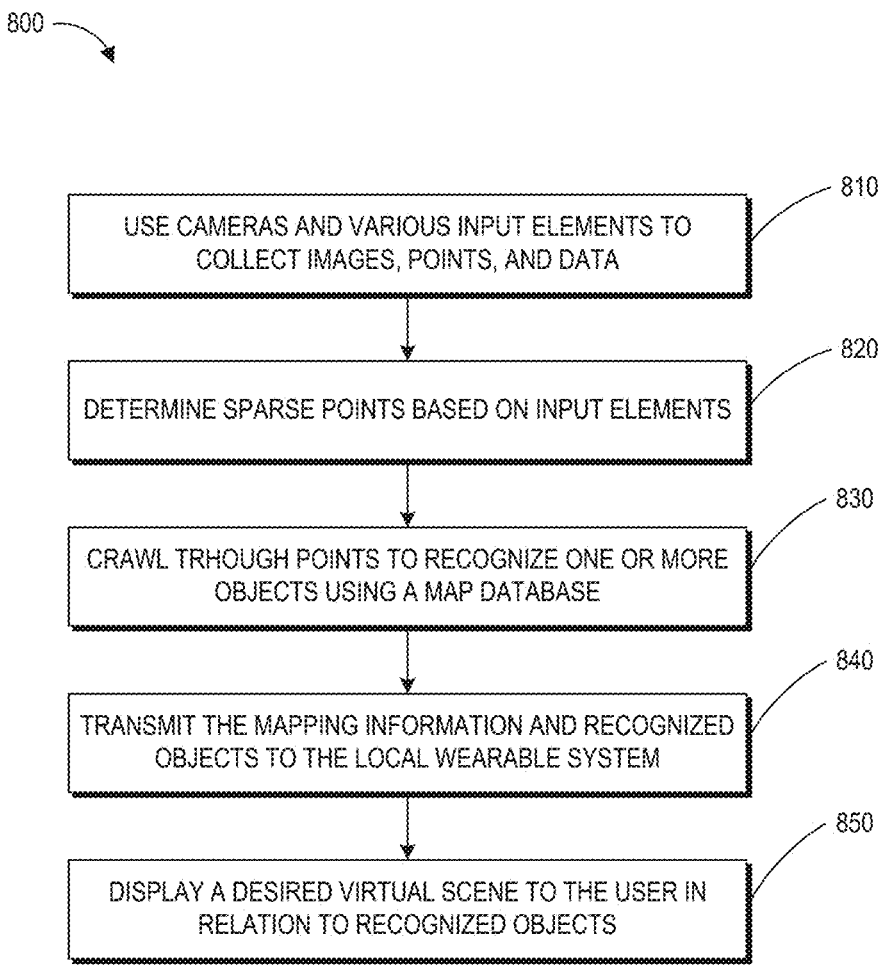
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
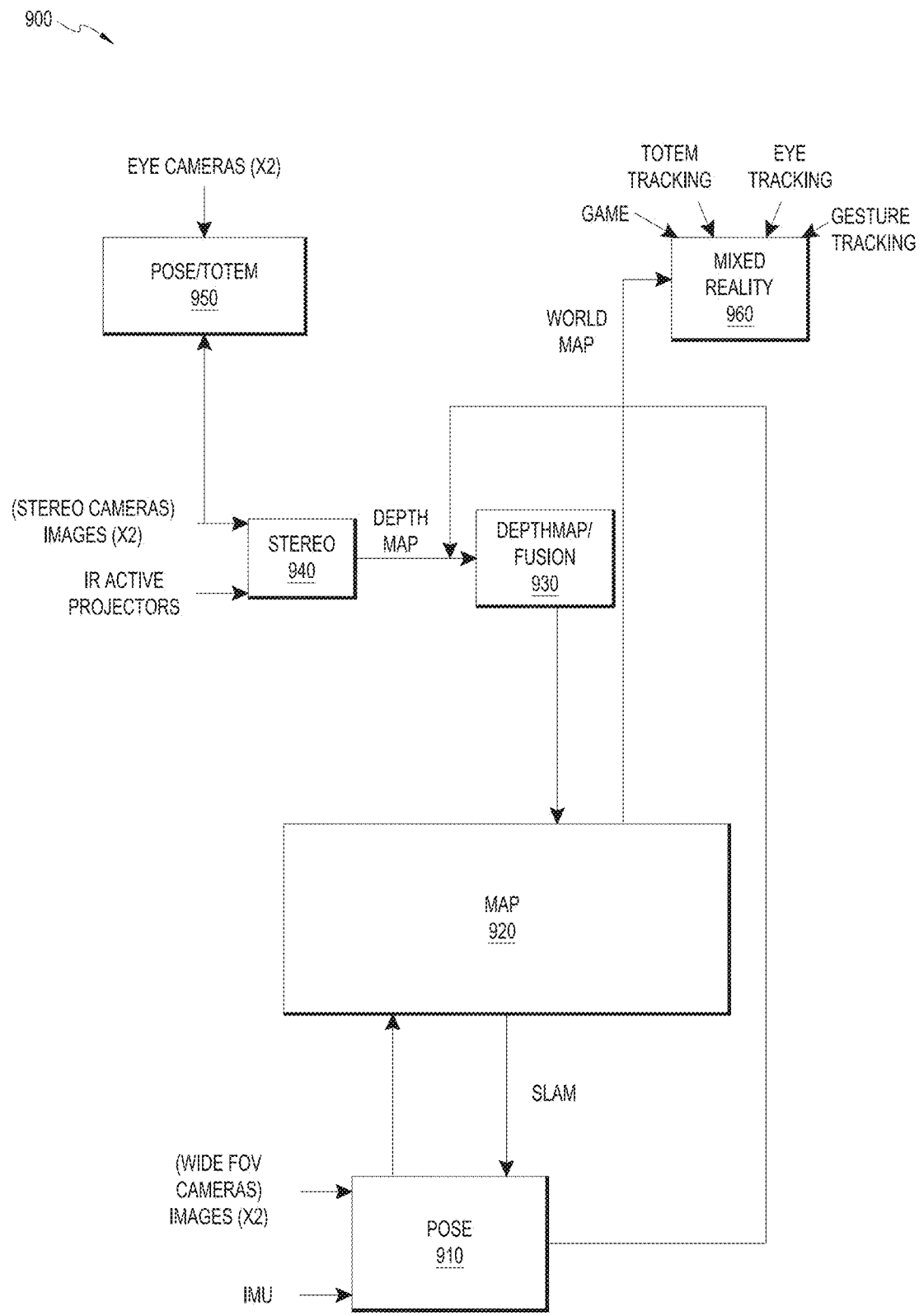
FIG. 9 is a block diagram of another example of a wearable system.

FIG. 9 is a block diagram of another example of a wearable system. In this example, the wearable system 900 comprises a map 920, which may include the map database 710 containing map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
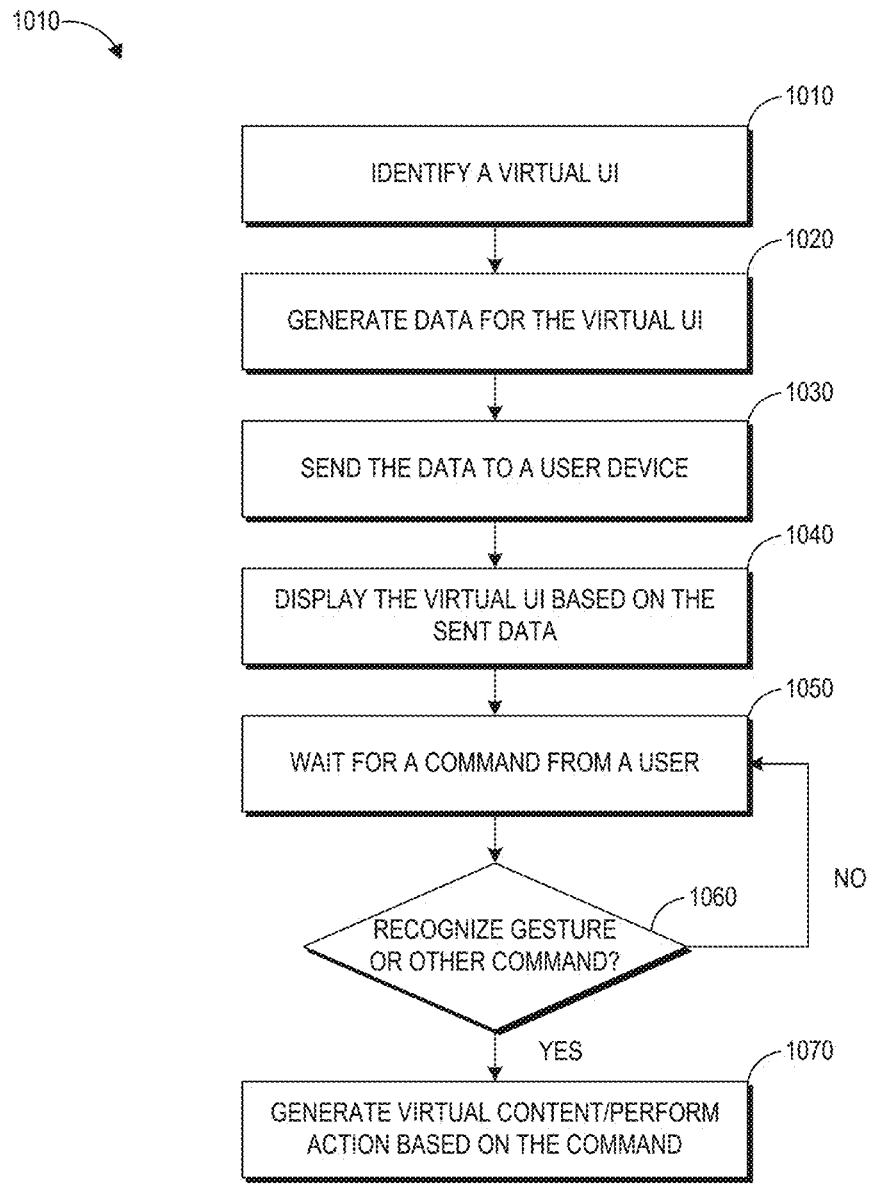
FIG. 10 is a process flow diagram of an example of a method for interacting with a virtual user interface.

FIG. 10 is a process flow diagram of an example of a method 1000 for interacting with a virtual user interface. The method 1000 may be performed by the wearable system described herein. The method 1000 may perform the method 1000 in a telepresence session.

At block 1010, the wearable system may identify a particular UI. The type of UI may be predetermined by the user. The wearable system may identify that a particular UI needs to be populated based on a user input (e.g., gesture, visual data, audio data, sensory data, direct command, etc.). The UI may be specific to a telepresence session. At block 1020, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the telepresence context, the UI may be displayed as if the UI were surrounding user to create a tangible sense of another user's presence in the environment (e.g., the UI can display virtual avatars of the participants around the user). If the UI is hand centric, the map coordinates of the user's hands may be determined. These map points may be derived through data received through the FOV cameras, sensory input, or any other type of collected data.

At block 1030, the wearable system may send the data to the display from the cloud or the data may be sent from a local database to the display components. At block 1040, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1050. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1060), virtual content associated with the command may be displayed to the user (block 1070).

Examples of a Wearable Device

Figure 11:
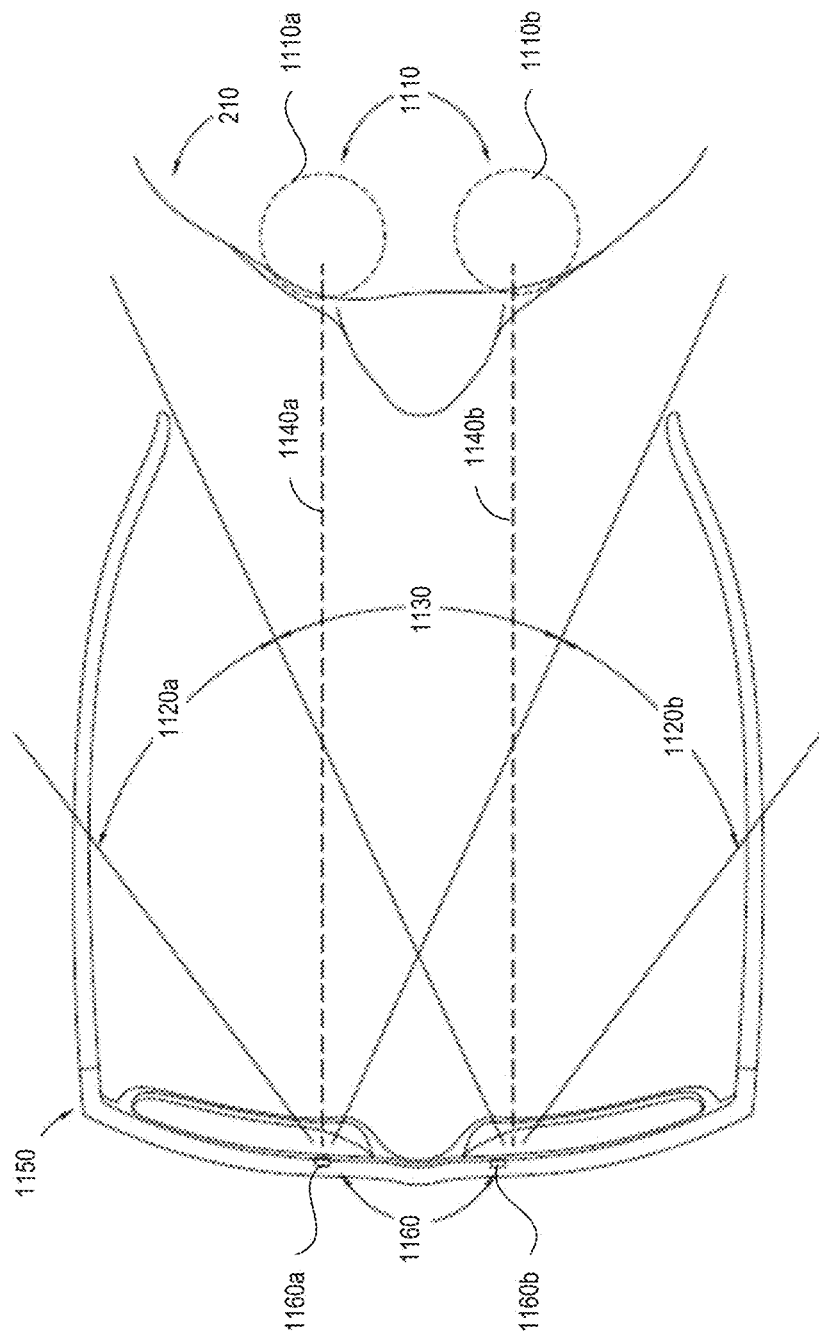
FIG. 11 illustrates an example wearable device which can acquire images of the user's face.

FIG. 11 illustrates an example wearable device which can acquire images of the user's face. The wearable device may be a head-mounted device (HMD) that is configured to display AR, VR, and/or MR contents. The images acquired by the wearable device can include still images, animations, individual frames from a video, or a video.

The wearable device 1150 in FIG. 11 may be part of the wearable system 200 described with reference to FIG. 2. The wearable device 1150 can include an imaging system 1160 which can be configured to image the user's 210 face. The imaging system 1160 may be an example of the inward-facing imaging system 462 shown in FIG. 4. For example, the imaging system 1160 may include sensors such as eye cameras (eye camera 1160a and eye camera 1160b) configured to image the periocular region of the user's eyes 1110 while the user 210 is wearing the wearable device 1150. In this example, the eye 1110b can correspond to the eye 302 and the eye 1110a can correspond to the eye 304 shown in FIG. 3.

Each eye camera may have a field-of-view (FOV). For example, the FOV for the eye camera 1160a can include the region 1120a and the region 1130. The FOV for the eye camera 1160b can include the region 1120b and the region 1130. The FOV of the eye camera 1160a and the FOV of the eye camera 1160b may overlap at the region 1130.

As shown in FIG. 11, the imaging system 1160 points toward the head of the user 210. The eye camera 1160a may be configured to image the eye 1110a while the eye camera 1160b may be configured to image the eye 1110b. In this figure, the optical axis 1140a of the eye camera 1160a is parallel to the optical axis 1140b of the eye camera 1160b.

In some implementations, one or both of the eye cameras may be rotated such that the optical axes of the two eye cameras are no longer in parallel. For example, the two eye cameras may point slightly towards each other (e.g., particularly if the eye cameras are disposed near outside edges of the frame of the device 1150). This implementation may be advantageous because it can create a cross eyed configuration which can increase the overlap of the FOV between the two cameras as well as to allow the two eye cameras to image the face at a closer distance.

Although the example described in FIG. 11 illustrates two eye cameras, wearable device 1150 is not required to have two eye cameras. In some embodiments, the imaging system 1160 may include one eye camera imaging the user's face. The one eye camera may be configured to image the periocular region associated with one eye or the periocular regions for both eyes. In other embodiments, the wearable device 1150 may include more than two eye cameras.

Examples of a Face Model

In the contexts of face recognition, synthesis, and rendering, the human face may be represented using 3D modeling techniques, such as triangular meshes, parametric surfaces, linear space representations, or other mathematical representations. As one example, the 3D model may be built using a deformable linear model (DLM). The DLM can encode the state of deformations of the face with a list of vectors. The deformation vectors may be associated with a neutral face, making a nose bigger, making a mouth narrower, or making a face more feminine, etc. The deformation vectors may also be associated with facial expressions, such as smiling, scowling, or frowning, etc. Given the strength of the facial expression (such as laughing out loud or gently smiling), the deformation vectors may be scaled by a strength value relative to the neutral face mesh. For example, the strength value may be bigger if the person laughs out loud because the person may have more facial movements and therefore bigger deformation with respect to the neutral face. On the other hand, the strength value may be smaller if the person smiles gently because there may be not many facial movements. Although DLM models can be used, the present disclosure is not limited to DLM models, and in other embodiments, active shape models (ASM), active appearance models (AAM), morphable models (M), or any other two-dimensional (2D) or 3D shape or texture model may be used.

The wearable device 1150 can build a model of the user's face using the images of the user's face acquired by the imaging system 1160. The images may be acquired by the imaging system 1160 when the user is putting on or taking off the device. The images may also be acquired by scanning the user's face using the outward-facing imaging system 464 (shown in FIG. 4). For example, to scan the user's face using the outward-facing imaging system 464, the user may turn the wearable device 1150 such that the outward-facing imaging system 464 is pointing toward the user's face (rather than the user's environment). The wearable device can create a model of the user's face during an initialization phase of the wearable device, such as, e.g., when the user first uses the wearable device, or when a user turns on the wearable device. Examples of generating a face model using images acquired by the imaging system 1160 are also described in U.S. application Ser. No. 15/717,223, titled "FACE MODEL CAPTURE BY A WEARABLE DEVICE," the disclosure of which is hereby incorporated by reference herein in its entirety.

The model of the user's face may be generated based on a base model and data specific to a user. For example, the wearable device may use a base model pre-generated from data associated with a group of people and customize the base model based on user specific information obtained by analyzing the images acquired by the wearable device. In some implementations, the base model may be associated with a group of people having similar demographic information (e.g., age, gender, ethnicity, etc.) to the user of the wearable device. For example, if the user is a female teenager, the wearable device may access a base model associated with a typical female teenager. As another example, if the user belongs to certain gender or ethnic group, the wearable device may access a base model common to that gender or ethnic group. The wearable device can also use statistical analysis to determine the appearnaces of the user's facial features. For example, the wearable device can determine a likelihood that a certain facial appearance of the facial feature will apply based on statistical analysis on images associated with a group of people or the user. The wearable device can confirm the appearance of the facial features (such as the appearance of periocular features) based on images acquired specific to the user.

The wearable device can also build the face model based on the user specific images. For example, the wearable device may generate a model of the user's face solely from the images acquired by the inward-facing imaging system or by the outward-facing imaging system. In some implementations, the wearable device may update the user's face model as more images of the user's face are acquired. For example, the wearable device may generate a face model based on the images acquired by the inward-facing imaging system as the user is putting on the device. The wearable device can update the face model based on new images acquired when the user is taking off the device or in the next session where the user is putting on the device again.

Although these examples refer to building a face model or creating a map of a user's face using a wearable device, some embodiments may include the wearable device communicating with a remote computing device to generate or otherwise obtain a face model. For example, the wearable device can acquire images of the user's face and pass the images (alone or in combination with other information of the user, such as, e.g., the user's demographic information) to a remote computing device (e.g., such as a server). The remote computing device can analyze the images and create the face model and pass the face model to the wearable device of the user or pass the face model to another user's wearable device (e.g., during a telepresence session).

A portion of the face model may describe features in the lower face of the user such as visemes, jaw movements, etc. The conformations of the lower face in the face model may change as the user generates different sounds (such as speaking). For example, a sound may be associated with a phoneme, which is a perceptually distinct unit of sound in a particular language. Phonemes are used to distinguish one word from another word. Each phoneme may further be mapped to a viseme, which can represent a facial conformation that occurs when the phoneme is sounded. In many languages, there is not a one-to-one correspondence between visemes and phonemes, as several phonemes may correspond to a single viseme (e.g., each such phoneme looks the same on the face when sounded). A viseme may be expressed by face model parameter values associated with a certain conformation of the face. As the user pronounces a different word, the viseme may change. Therefore, the conformation of the face may change and the parameters in the face model describing the lower face may also be updated accordingly.

As described herein, in some situations, the face model may not be able to obtain the updates in the conformations of the lower face of the user by direct measurement when the user is wearing an HMD (e.g., because an inward-facing eye-tracking camera typically cannot image the lower face). However, the HMD can use an inward-facing imaging system (e.g. imaging system 462 or 1160) to observe the user's periocular features. As further described with reference to FIGS. 13-16, the HMD can use a machine learning derived model to map the observed periocular features with parameters the lower face. These lower face parameters, together with the parameters derived from the periocular images, may be used to synthesize a full face image of the user.

Examples of a Periocular Region

Figure 12:
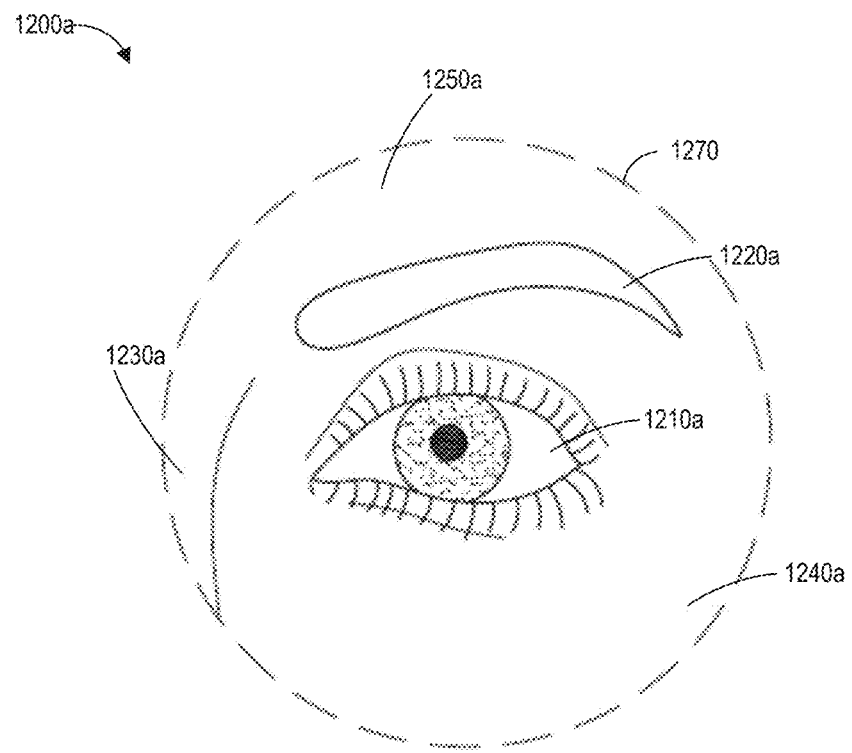
FIG. 12 illustrates an example image of a periocular region for one eye.

As described with reference to FIG. 11, the images acquired by the imaging system 1160 may include a portion of the periocular region of the user. The periocular region can include the eyes and the regions around the eyes. FIG. 12 illustrates an example image of a periocular region for one eye. In this example, the periocular region 1200a can include an eye 1210a (such as an eye socket) and a region around the eye 1210a. The region around the eye 1210a may include, for example, an eyebrow 1220a, portions of the nose 1230a, cheek 1240a, and forehead 1250a. The periocular region can include one or more periocular feature, or portions of periocular features. Periocular features may include, for example, an eye, an eye socket, an eyebrow, a nose, a cheek, or a forehead. Other features or user-specific details of the face may also be considered periocular features. The periocular region, however, may exclude the mouth or the portion of the nose that is away from the eyes. In some implementations, the periocular region may be represented by keypoints, point clouds, vectors and matrices, or other types of mathematical representations.

The example image 1200a could be obtained from an HMD's camera imaging the periocular region 1270 of a user. In this example, the periocular region 1270 includes periocular features such as an eye 1210a, an eye socket), eyebrow 1220a, portions of the nose 1230a, cheek 1240a, and forehead 1250a. Each periocular feature may have a variety of characteristics associated with the periocular feature. Some of the characteristics may be specific to each periocular feature. For example, the periocular feature eyebrow 1220a may have characteristics including the shape of the eyebrows, the color of the eyebrow, likely movements or movement directions of the eyebrow, etc. The periocular feature eye 1210a may have characteristics such as, for example, shape, size, location of eye corners, gaze direction, pupil location, location of eyeball center, shape and folds of the eyelid, texture of skin around the eyeball, and so forth. Many other characteristics may also be used to identify and track each periocular feature. One or more characteristic of one or more periocular feature may be represented by keypoints, point clouds, or other types of mathematical representations.

The wearable device can compute and track periocular features and associated characteristics using neural network or visual keypoints techniques such as scale-invariant feature transform (SIFT), speeded up robust features (SURF), oriented FAST and rotated BRIEF (ORB), binary robust invariant scalable keypoints (BRISK), fast retina keypoint (FREAK), etc. In some embodiments, a particular facial feature may be tracked using a detector specifically designed for that particular periocular feature. For example, periocular feature characteristics, such as eye corners, nose features, mouth corners, etc., may be identified and tracked separately using various algorithms. Tracking one or more of these periocular feature characteristics separately may be advantageous because each periocular feature and/or characteristic may be prone to substantial motion while the user making facial expressions or is speaking. The algorithms used to track these periocular features and characteristics may take into account the range of mobility. As an example, some periocular features and/or associated characteristics may be likely to move in certain directions and/or may be likely to remain more stable in other directions (e.g., eyebrows tend to move up or down but not left or right).

The wearable device can analyze the movements of the periocular features statistically. These statistics may be used to determine the likelihood that the facial features will move in a certain direction. The movements of the facial features can be used to calculate deformations of one or more parameters in a face model. In some embodiments, one or more periocular features or characteristics may be removed or untracked to reduce processing demand or to improve reliability. In the situations where it is desired to improve reliability, it may be advantageous to ignore or mask periocular features or characteristics that are more error prone than others. For example, in some embodiments as described with reference to FIG. 12B, the wearable device may ignore pixels in a center area 1212 of the eye 1210b so that eye movement is not recognized by the HMD when tracking other periocular features or characteristics in the periocular region 1270.

The wearable device can also use visual simultaneous location and mapping (vSLAM) techniques, such as sequential Bayesian estimator (e.g., Kalman filter, extended Kalman filter, etc.), bundle adjustment, etc., to identify and track periocular features and characteristics. In some embodiments, the wearable device may be configured to allow depth perceptions and mapping of the user. For example, the wearable device can construct a dense map, which encodes at least a portion of the face, from data acquired by one or more cameras. In contrast with a keypoint map, the dense map may comprise patches or regions of the face whose 3D shape is measured.

The size and content within the periocular region captured by a camera on the wearable device may depend on the eye camera's FOV. In some implementations, the eye camera may not have a large FOV to fit all recognizable periocular features within the captured periocular region. For example, the images captured by the eye camera may include the eye socket but not the eyebrow. Technical specifications of the camera may determine which periocular features are most likely to remain present in multiple captured frames of a periocular region and which periocular features are most reliable for tracking.

As described with reference to FIG. 11, in some situations, although each eye camera is configured to image an eye, the two eye cameras (one for the left eye and one for the right eye) may have an overlapping FOV 1130 such that overlapping periocular regions are imaged by the cameras. This may be because the FOV of the two cameras is sufficiently wide, the cameras are angled inwardly toward a center of a user's face, the cameras are positioned near each other, and/or because the two cameras are sufficiently far away from the user. As a result, a portion of the user's face, typically a center portion (e.g., nose), may be captured by both eye cameras. The wearable device may combine the images obtained from the two cameras, determine whether the combined image includes periocular features, and if periocular features are determined to be present within the images, the wearable device may identify the periocular features.

Figure 13:
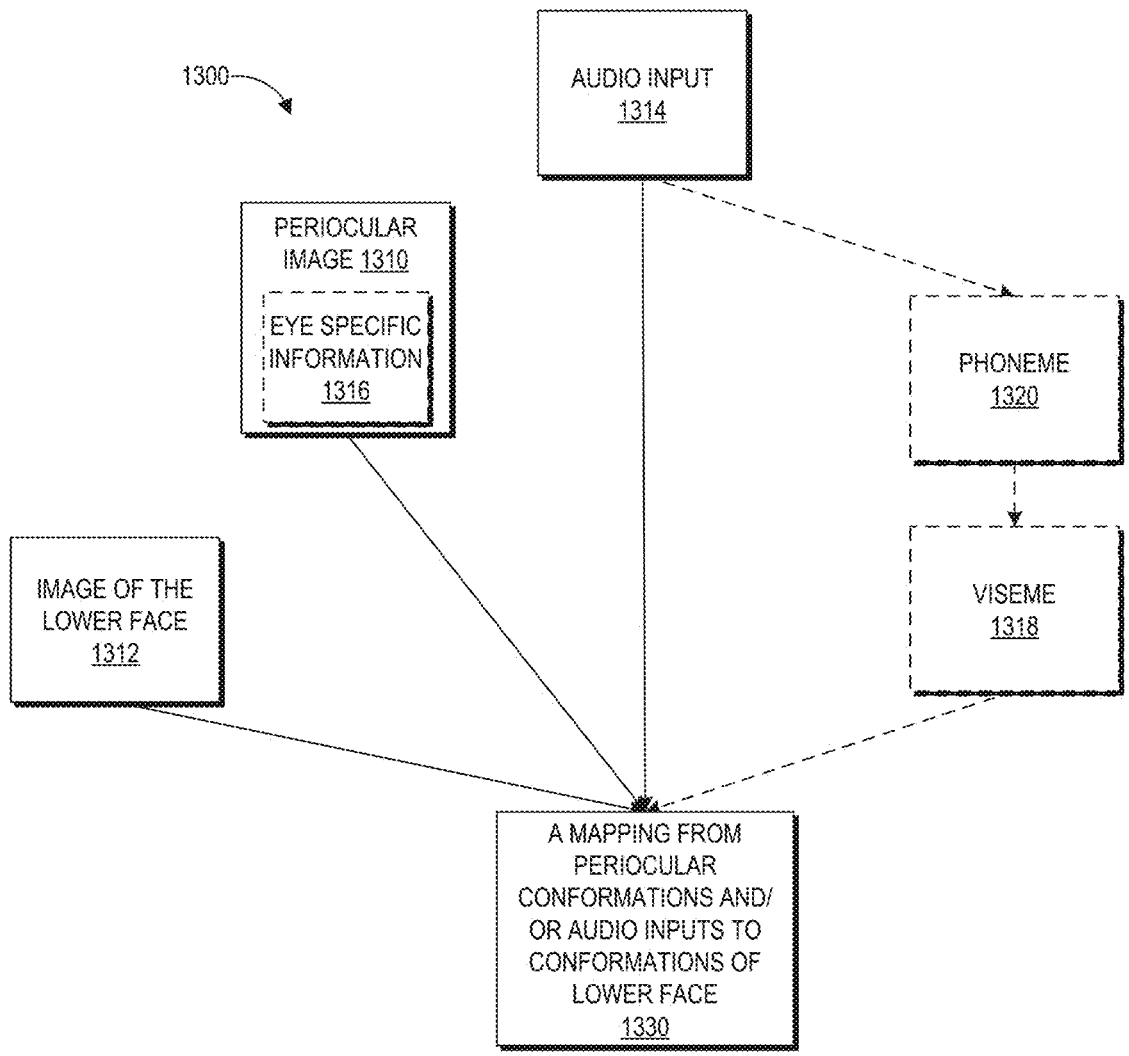
FIG. 13 illustrates an example of training a machine learning derived model which can correlate a conformation in the periocular region and an audio input with a conformation in the lower face.

Examples of Generating an Image of the Lower Face with an Image of the Periocular Region The images of the periocular region as well as movements in the periocular region may be used to deduce an image of the user's lower face, which cannot be observed directly by the imaging system of an HMD. FIG. 13 illustrates an example of training a machine learning derived model which can correlate a conformation in the periocular region and an audio input with a conformation in the lower face. In some situations, the conformation may be represented by vectors in a face model. The machine learning derived model can include a mapping of one or more parameters representing a conformation in the periocular region to other parameters representing a second conformation in the lower face.

The flow diagram 1300 in FIG. 13 may be performed by the wearable system described herein. For example, the training of the machine learning derived model may be performed by the local processing & data module 260, the remote processing module 270 using training data stored in the remote data repository 280 (shown in FIG. 2). As an example, an HMD can acquire the images and audio inputs, and communicate them via a network to another computing device (such as a server) for training the model.

In the flow diagram 1300, a mapping 1330 from the periocular conformations and/or the audio input to conformations of lower face 1330 may be generated. In certain implementations, the mapping 1330 can comprise an adjustment or deformation in the periodical region of a face model to another adjustment or deformation to the lower face region in the face model. The adjustment or deformation may be determined relative to a neutral position of the face model. The mapping 1330 may be generated using the images of the lower face 1312, periocular image 1310, eye specific information 1316, audio input 1314, alone or in combination. The conformations of the periocular region may include periocular images, and/or eye specific information. The conformation of the periocular region may also be described (or encoded) by periocular face parameters (e.g., the face space parameters in the DLM). The conformations of the lower face may include images or features of the lower face. The conformations of the lower face may be described (or encoded) by lower face parameters.

The periocular image 1310, the image of the lower face 1312, and the audio input 1314 may be specific to a user of the HMD or from a group of people. The mapping 1330 may be a generic mapping based on information from a group of people or an individual specific mapping using the user specific inputs. The mapping 1330 may also be based on information generic to a group of people but are further customized based on individual specific information.

The periocular images 1310 and the eye specific information 1316 may be acquired by an inward-facing imaging system. The periocular image 1310 may include periocular features. The periocular image 1310 may also include eye specific information 1316 such as eye pose, pupil dilation state, eye color, eyelid state, etc. In some implementations, the face parameters of a face model may not take into account eye specific information 1316. As a result, the wearable system may input the eye specific information 1316 as a separate input together with the periocular face parameters to train the machine derived learning model.

The image of the lower face 1312 may be acquired by a camera external to the wearable device. The image of the lower face 1312 may also be obtained using reflected images of the user's face as acquired by the outward-facing imaging system. In some embodiments, an HMD may include both an outward-facing imaging system and an inward-facing imaging system (as shown in FIG. 4). When the user is near a reflective surface (such as in front of a mirror), the HMD can simultaneously acquire a reflected image of the user's face using the outward-facing imaging system and the image of the periocular region using the inward-facing imaging system. The wearable device can capture the sound (e.g., the audio input 1314) when the user is speaking using an audio input sensor such as a microphone.

The audio input 1314, the periocular image 1310, and the image of the lower face 1312 may be acquired over time and/or from different users. For example, the wearable device may record the images and the audios over multiple telepresence sessions of a user. The wearable device may also acquire them from multiple users for generating a generic mapping 1330.

The mapping 1330 may be generated using various inputs. As one example, the mapping 1330 may be trained using the periocular image 1310 and the image of the lower face 1312. In this example, the mapping 1330 can correlate a periocular conformation with a conformation of the lower face. The mapping 1330 may also be generated using the audio input 1314, the periocular image 1310, and the image of the lower face. As a result, the mapping 1330 can correlate a sound and a corresponding periocular conformation with a conformation of the lower face. In some situations, a conformation can be associated with a parameter in a face model. For example, the parameter may include mathematical representations on deviations from a neutral face model. The mapping 1330 may include parameters of the periocular region mapped to the parameters of the lower face.

In some embodiments, the images of the lower face 1312 may not be available for training the mapping 1330. As a result, the training process may involve identifying a phoneme 1320 from the audio input 1314 and using the phoneme to determine a viseme 1318 in the audio input 1314.

The mapping 1330 may involve a correlation between the periocular image 1310 and the viseme 1318. Additionally or alternatively, the mapping 1330 may be associated with mapping from a sound in the audio input 1314 to a viseme 1318. As further described with reference to FIGS. 14 and 16, the viseme 1318 may be combined with the periocular image 1310 to generate a face image. The viseme may be determined using data from a group of people. The viseme may also be determined based on user specific data. For example, the wearable device can acquire images of the corresponding visemes as the user speaks. Phonemes may not have a one-to-one mapping to the visual visemes because many sounds may be pronounced using the same viseme. As a result, the wearable device may identify the same viseme even though the audio input 1314 is different.

The wearable device can associate an image of the lower face, an image of the periocular region, and optionally an audio input, for example, based on the time of acquisition. In certain embodiments, the wearable device can also associate an image of the lower face and an image of the periocular region based on the sound. As one example, the user may not always be near a reflective surface as the user speaks. As a result, the images of the lower face may be acquired at different times as the images of the periocular region. The wearable device can identify a word spoken by the user as well as lower face images associated with the word when the user is in front of a mirror and can identify periocular images acquired when the same word is spoken by the user. The wearable device can accordingly connect the lower face images with the images of the periocular region based on the sound of the word.

The output of the mapping 1330 may include an image or face parameters of at least a portion of the face. For example, where the lower face region is unobservable by the wearable device, the wearable device may apply the mapping 1330 to the periocular images (which are observable by wearable device) and to output an image of the lower face, lower face parameters, a full face image, or face parameters of the full face.

The mapping 1330 may include a probabilistic estimate for corresponding face parameters or the images of the lower face. For example, the user's periocular region may have similar appearance even though the user is making a different sound. As a result, the mapping 1330 may provide a likelihood on whether unobserved face parameters in the lower face are associated with observed face parameters in the periocular region. The wearable device may pick the most likely image or face parameters. The likelihood of an image may also be based on other factors such as audio input, physiological data (such as pupil dilation state, heart rate, etc.), and so on, alone or in combination.

Various machine learning algorithms may be used for this process. Some examples of machine learning algorithms that can be used to generate and update the models can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable system can generate a base model. The base model may be used as a starting point to generate additional models specific to a data type (e.g., a particular user), a data set (e.g., a set of additional images obtained), conditional situations (e.g., fit during gameplay may be different than fit during Internet browsing), or other variations. In some embodiments, the wearable device can be configured to utilize a plurality of techniques to generate models for analysis of the aggregated data. Other techniques may include using predefined thresholds or data values. Over time, the wearable device can continue to update the machine learning derived model 1330.

With reference to FIG. 13, the base model may include a mapping of the periocular image to the lower face as generated using data from a group of people. The mapping 1330 may be customized for each of a number of users of the HMD (e.g., a family may share use of a single HMD and can customize a mapping for each family member).

Examples of Synthesizing a Face Image

Figure 14:
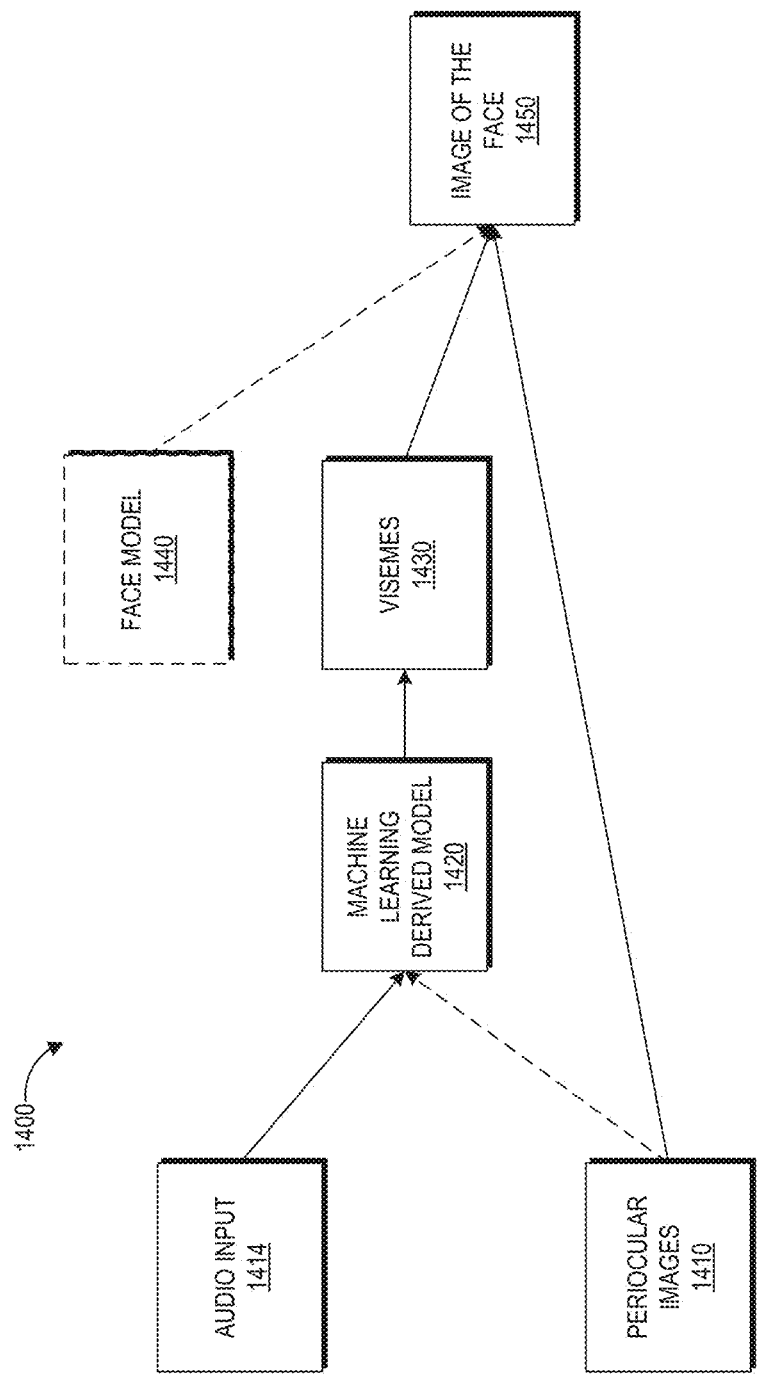
FIG. 14 illustrates an example of generating an image of the face when a portion of the face is not observed by a wearable device.

FIG. 14 illustrates an example of generating an image of the face when a portion of the face is not observed by a wearable device. The flow diagram 1400 in FIG. 14 may be performed by the wearable device described herein. In this example, the wearable device may include an inward-facing imaging system which can acquire periocular images 1410 of the user. The wearable device can also include audio sensors which can obtain audio input 1414 from the user. However, the inward-facing imaging system may not be able to acquire the image of the user's lower face.

To synthesize an image of the user's face, the wearable device to can apply the machine learning derived model 1420 to the audio input 1414 and/or the periocular images 1410. The machine learning derived model 1420 may produce the mapping 1330 described in FIG. 13. The wearable device can receive an audio stream from an audio sensor as the user speaks. The wearable device can access the machine learning derived model 1420 which may provide a mapping from a phoneme to a viseme. The wearable device can feed the audio stream to the machine learning derived model 1420 to obtain visemes 1430 of the sounds in the audio stream. The visemes may be combined with the periocular images 1410 to produce an image of the face 1450.

Additionally or alternatively, the wearable device can apply the machine learning derived model 1430 to a combination of the periocular images 1410 and the audio input 1414 to obtain visemes 1430. In this example, the machine learning derived model 1420 may produce a mapping from a sound and a periocular image to a viseme.

As another example, the machine learning derived model 1420 may include a mapping from periocular images to lower face images (or visemes). The wearable device can obtain a viseme by applying the machine learning derived model 1420 to the periocular images acquired by the inward-facing imaging system.

In addition to or in alternative to mapping images, the machine learning derived model 1420 may also provide mappings for other types of conformations such as from periocular face parameters to lower face parameters, from periocular features to lower face parameters/images, or from periocular features/images/face parameters to a full face image or parameters. As an example, the wearable device can calculate the periocular face parameters based on the periocular images 1410. When the user is speaking, the wearable device can input the periocular face parameters as determined from the periocular images 1410 and the sound into the machine learning derived model 1420. The mapping produced by the machine learning derived model 1420 may output an estimated current viseme 1430. The current viseme 1430 may be used to produce an estimate for the lower face parameters. In some situations, the periocular face parameters may not take into account the eye specific information 1316. As a result, the wearable device may input the eye specific information 1316 into the machine learning derived model 1420 as a factor (such as a factor separate from the periocular face parameters) in the mapping for determining the visemes 1430.

In some implementations, the machine learning derived model 1420 may output an image of the face in addition to or in alternative to the visemes. For example, the machine learning derived model 1420 may associate an audio input 1414 and a periocular image to an image of the full face. Therefore, the wearable system does not have to synthesize the image of the face 1450 after receiving the output from the machine learning derived model 1420. In certain implementations, the machine learning derived model 1420 may output face parameters in a 3D face model, where the face parameters may be associated with the visemes 1430 or the image of the face 1450.

The wearable system can combine the conformations of the lower face and the periocular region to generate an image of the face 1450. For example, the wearable system can combine the periocular image with the image of the lower face to create a full face image. In some implementations, the wearable system can dynamically update a previously generated face model 1440 with the observed periocular images 1410 and the estimated visemes 1430 to create images of the face as the user speaks. The face model 1440 may be a generic model generated based on data from a group of people. The face model 1440 may also be user specific. For example, the face model may be generated with images acquired by the inward-facing imaging system while the user is putting on the device.

The user can also customize the face model, for example, by selecting different facial features and texture maps. As an example, the user can select the appearance of a fantasy creature such as a science fiction alien.

The wearable device can dynamically update one or more face parameters of the face model as the user is speaking to reflect the facial movements of the user. For example, the wearable device can update the periocular region of the face model by calculating changes to the periocular face parameters 1410 based on new images of the periocular region. The wearable device can also update the lower face of the user using the visemes 1430 estimated based on the periocular images 1410.

Additionally or alternatively, the wearable device can animate the user's facial expressions by combining the images 1410 from the periocular region, visemes 1430, and other portions of the user's face. For example, when a user makes a sound, the image 1410 of the periocular region and the image of the viseme 1430 may change based on the sound. But in some implementations, only one of the image 1410 of the periocular region or the image of the viseme 1430 may change. For example, the user may have the same periocular expression while making different sound.

In some situations, the mapping 1330 may generate at an intermediate stage a likelihood that each of a set of possible conformations of the lower face matches the conformation of the observed periocular region. The wearable system may select the conformation of the lower face that is associated with the highest likelihood if such conformation passes a threshold criterion. The wearable device may also calculate an accuracy of the estimated conformation of the lower face based on the input received.

The image of the face 1450 may be used in a telepresence session. For example, when two users are in a telepresence session, the wearable device of a user may communicate updates on the face parameters of the user or the image of the face to the wearable device of the other user. The other user's wearable device may therefore update or provide an animation of the virtual appearance of the user (e.g. the user's face) based on the updated face parameters to provide a more vivid animation as the user speaks.

In some implementations, the face parameters may not include the eye specific information 1316. But the mapping may nevertheless incorporate the eye specific information 1316 as observed by the inward-facing imaging system in the image of the face. For example, eye specific information may be used as a separate input when the mapping is trained. The wearable device can also pass the parameters for the eye specific information 1316 to another user's wearable device which can include and update the user's eye movement in the user's virtual appearance.

Although the examples are described with reference to using periocular images to deduce the conformations of the lower face, similar techniques may also be used to deduce the movement or image of other unobserved regions of the user, such as the user's cheek, or user's body movements (e.g., waving arms when a user is angry), etc. For example, for certain users, there may be a strong correlation between the head movements and the facial expressions (such as lower face movements or periocular movements). The wearable device can acquire head movement data using the IMUs described in FIG. 2 and use the head movement data to deduce at least a portion of the face parameters or a portion of the face image face image. In some situations, the periocular region may not be imaged while other regions of the user may be imaged. For example, the wearable device may obtain images of the user's lower face by, for example, acquiring the reflected the images of the user's face using the outward-facing imaging system. As another example, an external camera can be used to observe the user's body movements and the movement of the user's head. However, the periocular region may not be imaged when the outward-facing imaging system or the external camera is used because the periocular region is occluded by the wearable device. The wearable devices may use similar techniques to deduce the conformations of the periocular region with observed images of the lower face. The wearable device may generate a mapping of the conformations of the lower face to periocular conformations and apply the mapping to determine the periocular conformations using images of the observed regions and/or audio input. For example, the mapping may be from the visemes 1430 to the periocular images 1410. The wearable device can use the audio input to determine a phoneme which can further be used to determine a viseme 1430. The wearable device can use the viseme 1430 and/or the audio input to identify a corresponding periocular image/parameter.

In some implementations, the periocular image acquired may include information for only one eye. The wearable device may generate an image or determine the periocular face parameters for the other eye based on the acquired periocular image. For example, the movements of the two eyes may be in the same direction, the eye colors may be the same, the shapes for the two eyes may be similar, the two eyes may be symmetric, etc. The wearable device can use information of one eye (e.g., the eye is looking at a certain direction when the user speaks a word, the user's pupil dilates when the user is excited, and so on) to determine information for the other eye and to incorporate the periocular images for both eyes to the image of the face.

Additionally or alternatively, the techniques described herein may also be used to model skin textures. For example, the skin color of the unobserved lower face may need to match the skin color of the observed periocular region. In some implementations, a person's demographic characteristics (such as age, gender, race, etc.) as well as skin conditions may be determined from the periocular images. The machine learning derived model 1420 may include a mapping from the observed characteristics of the periocular features to the characteristics of the lower face features. For example, where a periocular image includes a lot of wrinkles, the mapping may be used to deduce that the lower face image should also have wrinkles.

Example Process of Synthesizing a Full Face Image Using Periocular Images

Figure 15A:
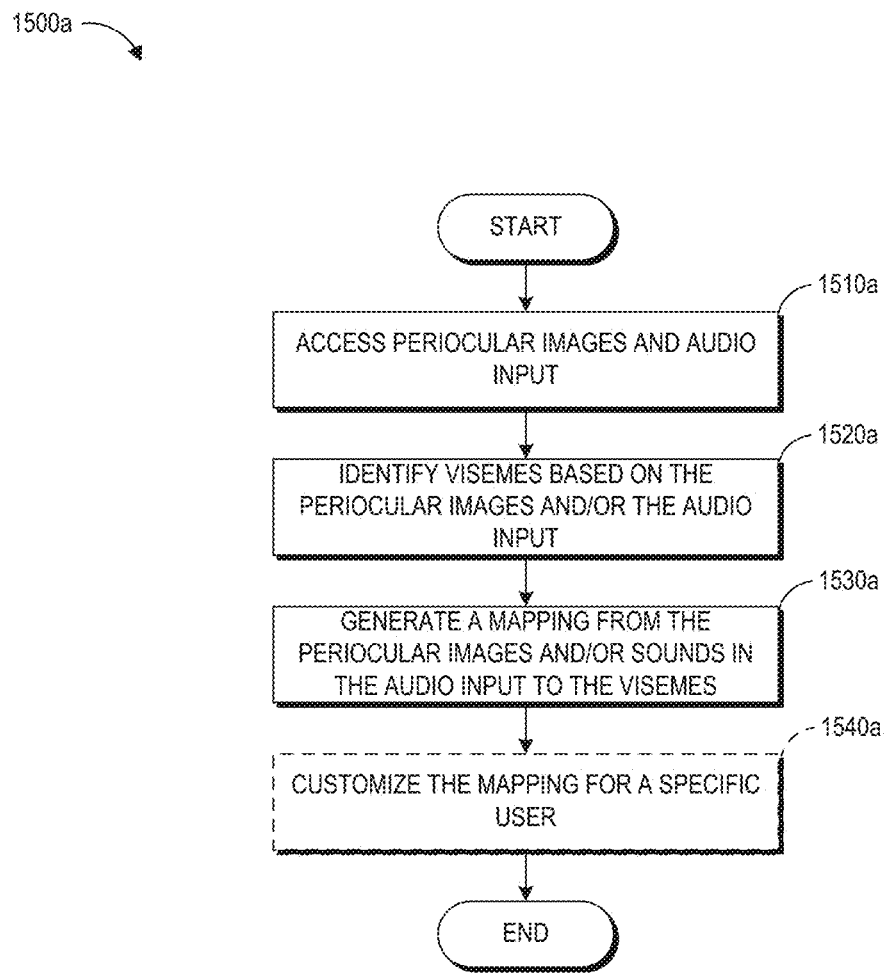
FIG. 15A describes an example process of generating a mapping from periocular images and/or sounds in the audio input to images of a lower face.

FIG. 15A describes an example process of generating a mapping between an image of the periocular region and an image of the lower face. The process 1500 may be performed by the wearable device described herein.

At block 1510a, the wearable device can access periocular images and audio input for a sound. The periocular images and audio input may be obtained from a group of people or be specific to a user.

At block 1520a, the wearable device can identify a viseme based on the periocular images or the audio input. For example, the wearable device can identify phonemes in the audio input, where the phonemes may further be associated with visemes. The wearable device may use machine learning techniques to generate a mapping from the phonemes to the visemes.

The wearable device can also associate the visemes with the periocular images using machine learning techniques. For example, when a person is angry, the person may tend to speak certain words (therefore have certain visemes) and may have certain expressions in the periocular region. The machine learning derived model can correlate the periocular images with the visemes to generate a mapping from the periocular images to the visemes as shown in block 1530a.

In addition to or in alternative to determining visemes based on phonemes, the wearable device can also acquire the images of the lower face (including visemes) that correspond to the periocular images, for example, by using an external camera to image a person's face or by acquiring reflected images using the outward-facing imaging system. At block 1530a, the wearable device can input the periocular images, the images of the lower face, and optionally, the audio input to generate a mapping from the periocular images, the audio input, or a combination, to the images of the lower face. The mapping may also be generated using periocular face parameters. For example, the mapping may correlate periocular face parameters with lower face parameters. The periocular face parameters may be calculated based on periocular images while the lower face parameters in may be calculated based on the visemes.

At block 1540a, the wearable device can optionally tailor the mapping to a specific user if the mapping is generated based on data acquired from a group of people. For example, the wearable device can access additional audio information, user's periocular images, or images of the user's lower face to incorporate user specific conformations of the face into the mapping. In some embodiments, the mapping may be trained over time as more user specific information is obtained. For example, wearable device can record the user's speech, the periocular images, or the images of the lower face over time. The mapping may be updated based on the new information acquired. As an example, the wearable device may update the mapping every day, week, month, etc., or based on the user's interaction with the wearable device.

Figure 15B:
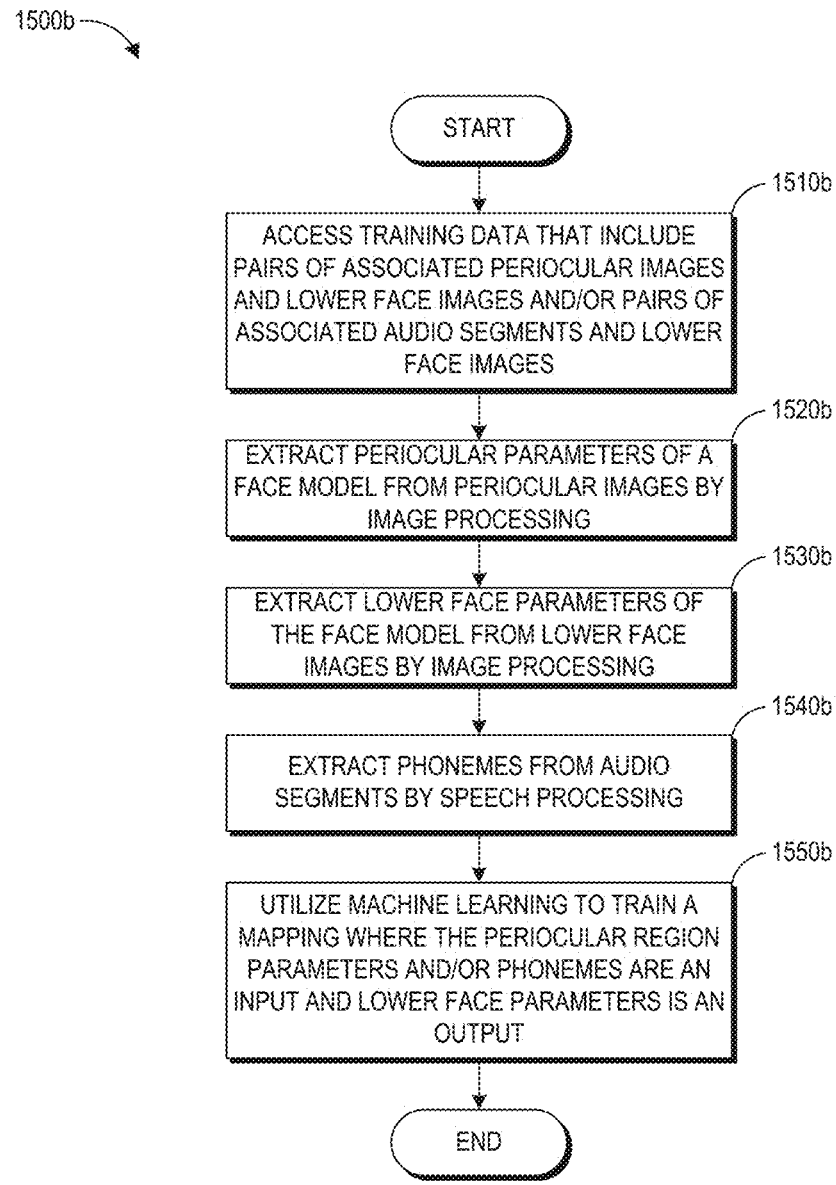
FIG. 15B illustrates another example process of training a mapping which has face parameters in the periocular region and/or phonemes as input and lower face parameters as output.

FIG. 15B illustrates another example process of training a mapping which has face parameters in the periocular region and/or phonemes as input and lower face parameters as output. The process 1500b may be performed by the wearable device described herein or by a remote computing system. The remote computing system may include computer servers configured to perform data analysis on a large data set.

At block 1510b, a computer system can access training data that includes pairs of associated periocular images and lower face images. Additionally or alternatively, the training data can also include pairs of associated audio segments and the lower face images. These images and audio segments may be associated with the same user or with multiple users. The training data may be stored in the remote data repository 280 described in FIG. 2. The periocular images may be acquired using the inward-facing imaging system 462. The lower face images may be acquired using the outward-facing imaging system 464 (e.g., when a user is in front of a mirror). The audio segments may be acquired using an audio sensor of the wearable device, such as a microphone.

In one case the feature vector (input to each mapping, that is extracted from input periocular images and audio segments) has one subset of input parameters corresponding to a phoneme and one subset of input parameters corresponding to periocular region derived face parameters. There may be multiple mappings one for each of a set of lower face parameter. Different feature vectors that each have a different list of parameters can be used in separate mappings for each lower face parameter.

The computer system can use image processing techniques to identify face parameters (such as periocular face parameters and lower face parameters) of a face model in the periocular images and in the lower face images at blocks 1520b and 1530b, respectively. The image processing techniques may include neural networks, visual keypoints techniques, or other facial feature recognition techniques to identify periocular features and lower face features.

At block 1540b, the computer system can extract phonemes from audio segments by speech processing. For example, the computer system can receive the audio segments recorded by a wearable device over a period of time. The computer system can use speech processing techniques to identify syllables in the speech processing. In some embodiments, the phonemes may further be associated with visemes which may be used to determine lower face parameters.

At block 1550b, the computer system can train a mapping using machine learning techniques. The periocular region parameters may be the input of the mapping while the lower face parameters may be the output of the mapping. In some embodiments, the input may also include the phonemes or the audio stream. The output of the mapping may also include lower face parameter which can be combined with periocular region face parameters to obtain a set of full face parameters.

Figure 16A:
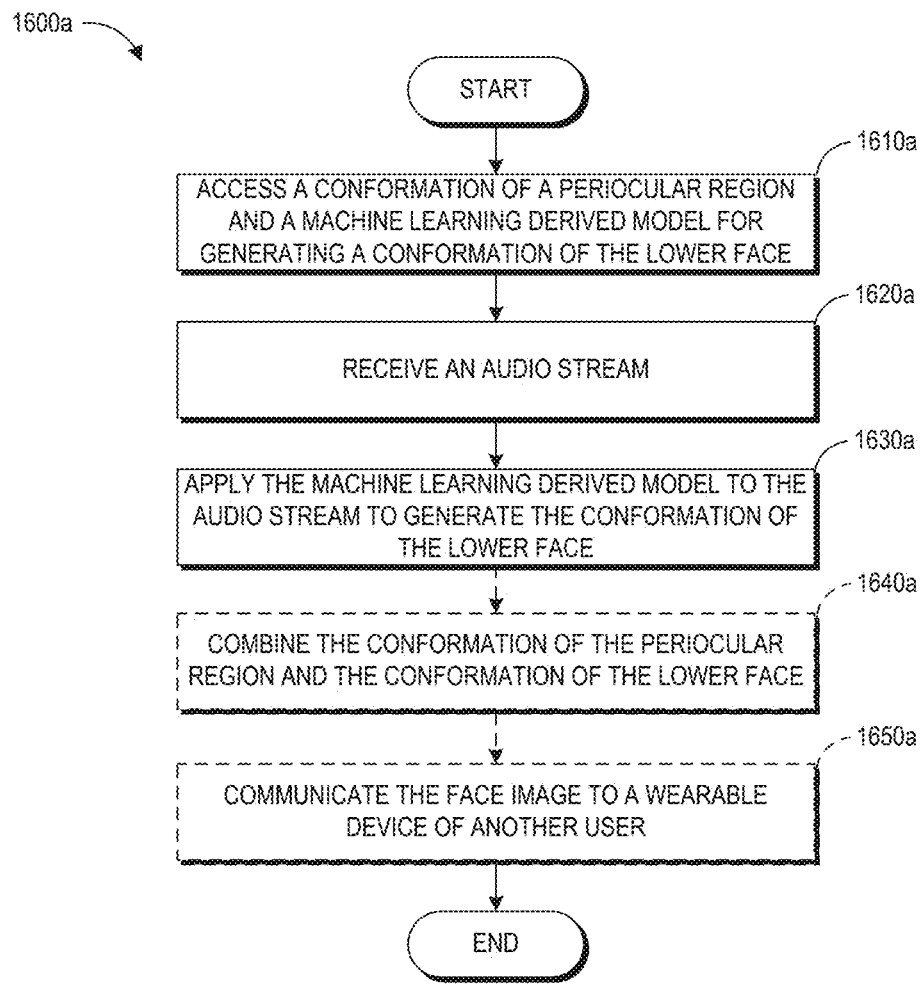
FIG. 16A describes an example process of synthesizing a full face image when a portion of the face is not observed by a wearable device.

FIG. 16A describes an example process of synthesizing a full face image when a portion of the face is not observed by a wearable device. The process 1600a may be performed by the wearable device described herein.

At block 1610a, the wearable device can access a conformation of the periocular region. The conformation may be encoded using face parameters (such as, for example, face feature vectors). The conformation may be determined by the periocular images acquired as the user speaks. The wearable device can access a machine learning derived model for generating a conformation of the lower face. In this example, the conformation of the lower face is not imaged by the wearable device when the user speaks. The machine learning derived model may be an example of the machine learning derived model 1420 described in FIG. 14. For example, the machine learning derived model may include a mapping from an audio input alone or in combination with a periocular conformation to a conformation of the lower face. The mapping can accept the one or more periocular face parameters as the input and output lower face parameters.

At block 1620a, the wearable device can receive an audio stream. The wearable device can include an audio sensor (such as a microphone) that can capture the sound generated by the user as the user speaks.

At block 1630a, the wearable device can apply the machine learning derived model to the audio stream to generate a conformation for the lower face. For example, the machine learning derived model may include a mapping from a phoneme to a viseme. The wearable device can identify phonemes in the audio stream and generate corresponding visemes from the audio stream. The visemes may also be encoded by one or more face parameters (such as lower face parameters). The wearable device can also use the audio input together with the image of the periocular region to identify a corresponding image of the lower face. In some embodiments, an image of the periocular region or a phoneme may be associated with multiple images of the lower face, where each image of the lower face may be associated with a likelihood of a match. The wearable device may pick the image of the lower face which has the highest likelihood. The likelihood of a match may change based on the amount information that the wearable device has. For example, the likelihood of an image may increase or decrease if the wearable device provides the sound together with the periocular image as compared to if the wearable device only provides the periocular image.

At block 1640a, the wearable device can combine the conformation of the periocular region and the conformation of the lower face to generate a full face image. The block 1640a may be optionally performed by the wearable device which acquires the periocular images and the audio stream. In some implementations, where wearable device only has an image for one eye, the wearable device can generate an image for the other eye and incorporate the image for the other eye into the full face image. The wearable device can also update a portion of an existing face image based on changes in the periocular region and the lower face.

Optionally at block 1650a, the wearable device can communicate the face image to a wearable device of another user, such as during a telepresence session. In some embodiments, the wearable device may communicate the lower face conformation and the periocular conformation to another user's wearable device. The other user's wearable device can combine generate a full face image using the received lower face conformation and the periocular conformation.

The wearable device can also communicate the updates on the face image to the wearable device of the other user. The updates on the face image may be in accordance with a refresh rate. For example, the user's face image may be updated at a frame rate of the wearable device of the other user, or a predefined time interval such as every $\frac{1}{24}$ seconds, $\frac{1}{48}$ seconds, 1 second, 2 seconds, etc. The wearable device of the other user can update the user's virtual avatar based on the received updates to the other user's face image.

In some implementations, the wearable device can pass the face parameters encoding a conformation of the lower face and/or the periocular region to another wearable device for synthesizing the full face image. For example, the wearable device can communicate the face parameters (instead of the full face image) to another wearable device which will synthesize the full face image using the received face parameters.

Figure 16B:
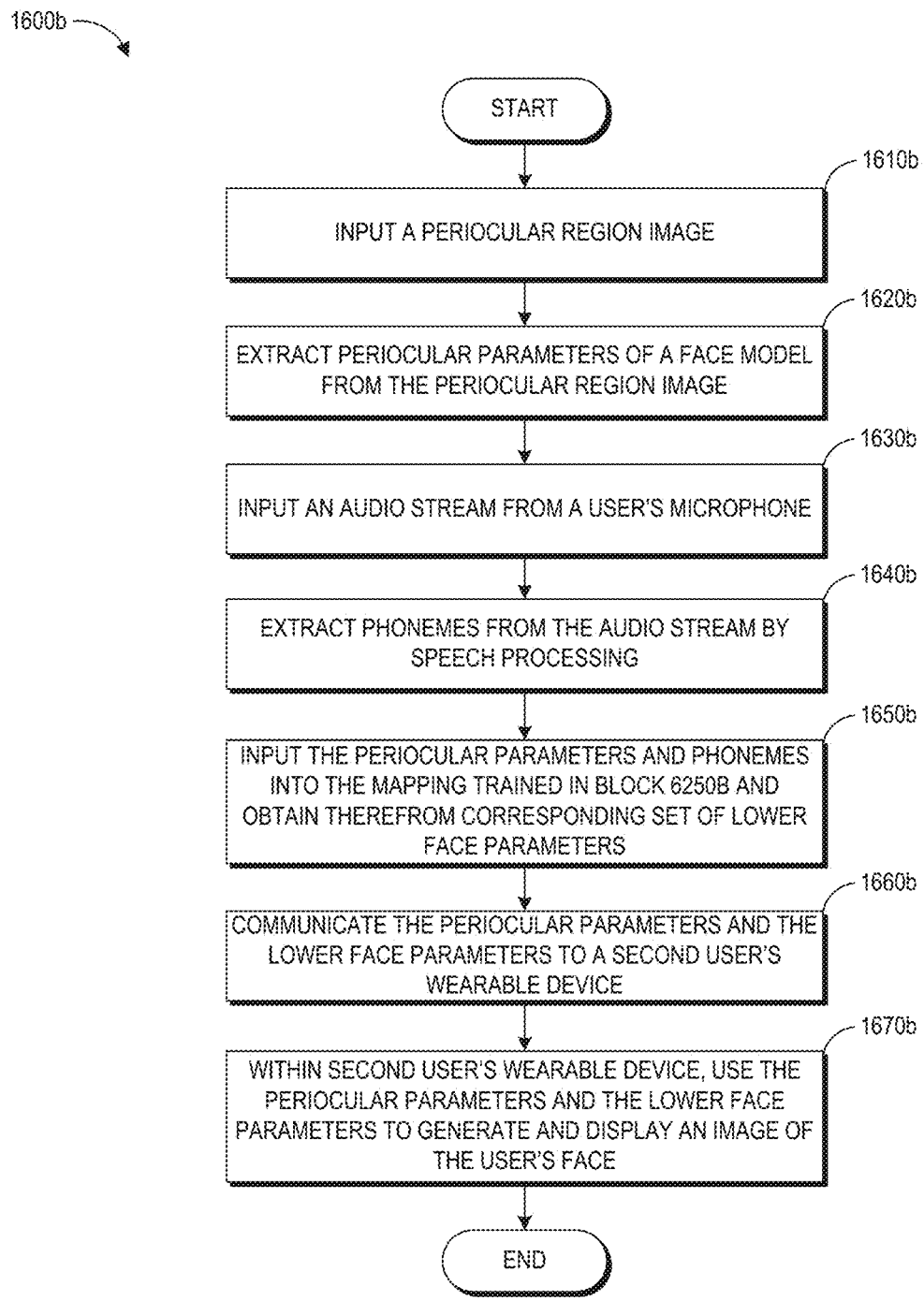
FIG. 16B illustrates an example of communicating a full face image of a first user to a second user's wearable device.

FIG. 16B illustrates an example of generating parameters representing a first user's face and communicating the parameters to a second user's wearable device where they can be used to generate a virtual representation of the first user's face. The process 1600b described in FIG. 16B may be performed by the wearable device described herein.

At block 1610b, the wearable device of the first user can receive a periocular image of the first user as an input. For example, the inward-facing imaging system 462 can acquire an image of the first user's periocular region and communicate the image to a processor for extracting face mode parameters from the image of the periocular region at block 1620b.

At block 1630b, the wearable device can receive an input audio stream from a microphone of the first user. The microphone may be part of the wearable device. At block 1640b, the wearable device can extract phonemes from the audio stream by speech processing. The phonemes may also be associated with visemes.

At block 1650b, the periocular face parameters and the phonemes can be inputted into a mapping trained by machine learning techniques (such as, e.g., the mapping trained in block 1550b). The mapping can output a set of lower face parameters corresponding to the periocular face parameters and the phonemes.

At block 1660b, the wearable device of the first user can communicate periocular face parameters and the lower face parameters to a second user's wearable device. The second user's wearable device can use the received periocular face parameters and the lower face parameters to generate and display an image of the first user's face at block 1670. In some embodiments, the wearable device of the first user sends updates to the periocular face parameters or the lower face parameters (instead of the full set of face parameters) to the second user's wearable device. The second user's wearable device can accordingly adjust the first user's image based on the updates.

Additional Aspects

In a 1st aspect, a method for generating an image of a face, the method comprising: under control of a head-mounted device (HMD) comprising a computer processor, an inward-facing imaging system configured to image a periocular region of a user and an audio sensor: acquiring an image, by the inward-facing imaging system, of the periocular region of the user; generating, based at least partly on the image, periocular face parameters encoding a periocular conformation of at least the periocular region of the user; acquiring, by the audio sensor, an audio stream spoken by the user; identifying a phoneme in the audio stream; accessing a mapping wherein an input of the mapping comprises a phoneme and the image of the periocular region of the user and an output of the mapping comprises lower face parameters encoding a lower face conformation of at least the lower face of the user; and combining the periocular face parameters and the lower face parameters to generate full face parameters.

In a 2nd aspect, the method of aspect 1, wherein the periocular face parameters and the lower face parameters are part of a three-dimensional (3D) face model.

In a 3rd aspect, the method of aspect 2, wherein the 3D face model comprises a deformable linear model and wherein the periocular face parameters and the lower face parameters describe a deformation of the face when the user is speaking.

In a 4th aspect, the method of aspect 3, wherein generating the full face parameters comprises updating the 3D face model to reflect an update to at least one of the lower face parameters or the periocular face parameters.

In a 5th aspect, the method of any one of aspects 1-4, wherein the input of the mapping further comprises eye specific information, comprising at least one of: an eye pose, a pupil dilation state, an eye color, or an eyelid state of the user.

In a 6th aspect, the method of any one of aspects 1-5, wherein the lower face parameters encode visemes which visually describe phonemes in the audio stream.

In a 7th aspect, the method of any one of aspects 1-6, further comprising communicating the full face parameters to a wearable device of another user.

In an 8th aspect, the method of any one of aspects 1-7, wherein the mapping comprises a likelihood that a periocular face parameter is associated with a lower face parameter, and the lower face parameters are selected to generate the full face image in response to a determination that they pass threshold criteria.

In a 9th aspect, the method of any one of aspects 1-8, further comprising inferring a skin texture of the face of the user based at least partly on the image of the periocular region.

In a 10th aspect, the method of any one of aspects 1-9, wherein the inward-facing imaging system comprises an eye camera and the image of the periocular region acquired by the inward-facing imaging system comprises an image of the periocular region for a first eye.

In an 11th aspect, the method of aspect 10, wherein generating the full face parameters comprises: determining periocular face parameters for a second eye based on the image of the periocular region acquired by the inward-facing imaging system; and incorporating the periocular face parameters for the second eye into the full face parameters.

In a 12th aspect, the method of any one of aspects 1-11, wherein the input of the mapping further comprises a body movement or a heart rate.

In a 13th aspect, the method of any one of aspects 1-12, wherein the image comprises at least one of a photo, a video frame, or a video.

In a 14th aspect, a method for generating an image of a face, the method comprising: under control of a head-mounted device (HMD) comprising a computer processor, an inward-facing imaging system configured to image a periocular region of a user: acquiring a periocular image, by the inward-facing imaging system, of the periocular region of the user; generating, based at least partly on the image, periocular face parameters encoding a periocular conformation of at least the periocular region of the user; accessing a mapping that generates lower face parameters encoding a lower face conformation of at least the lower face of the user, the mapping based at least in part on the periocular image of the periocular region of the user; combining the periocular face parameters and the lower face parameters to generate full face parameters; and generating an image of the face based at least partly on the full face parameters.

In a 15th aspect, the method of aspect 14, wherein the lower face conformation comprises a viseme and wherein the mapping generates the lower face parameters based at least partly on the periocular image and an audio input.

In a 16th aspect, the method of any one of aspects 14-15, wherein the periocular face parameters and the lower face parameters are part of a three-dimensional (3D) face model.

In a 17th aspect, the method of aspect 16, wherein the 3D face model comprises a deformable linear model and wherein the periocular face parameters and the lower face parameters describe a deformation of the face when the user is speaking.

In an 18th aspect, the method of aspect 17, wherein generating the full face parameters comprises updating the 3D face model to reflect an update to at least one of the lower face parameters or the periocular face parameters.

In a 19th aspect, the method of any one of aspects 14-18, wherein the input of the mapping further comprises eye specific information, the eye specific information comprising at least one of: an eye pose, a pupil dilation state, an eye color, or an eyelid state of the user.

In a 20th aspect, the method of any one of aspects 14-19, further comprising communicating the full face parameters to a wearable device of another user.

In a 21st aspect, the method of any one of aspects 14-20, wherein the mapping comprises a likelihood that a periocular face parameter is associated with a lower face parameter, and the lower face parameters are selected to generate the full face image in response to a determination that they pass threshold criteria.

In a 22nd aspect, the method of any one of aspects 14-21, further comprising inferring a skin texture of the face of the user based at least partly on the image of the periocular region.

In a 23rd aspect, the method of any one of aspects 14-22, wherein the input of the mapping further comprises a body movement or a heart rate.

In a 24th aspect, the method of any one of aspects 14-23, wherein generating the full face parameters comprises: determining periocular face parameters for a second eye based on the image of the periocular region acquired by the inward-facing imaging system; and incorporating the periocular face parameters for the second eye into the full face parameters.

In a 25th aspect, the method of any one of aspects 14-24, wherein generating the image comprises updating the image of the user's face at a predefined time interval.

In a 26th aspect, the method of any one of aspects 14-25, wherein the image comprises at least one of a still image or a video frame.

In a 27th aspect, a system for generating an image of a face, the system comprising: an inward-facing imaging system configured to image a periocular region of a user, an audio sensor, and a computer processor configured to perform any one of the methods in aspects 1-26.

In a 28th aspect, a method for generating a mapping from a first conformation of a periocular region of the face of a user to a second conformation of the face of the user, the method comprising: under control of a hardware computer system: accessing a first plurality of images associated with first conformations of the periocular region; determining a second plurality of images associated with second conformations of the face; training a machine learning derived model using the first plurality of images and the second plurality of images to generate a mapping from a first conformation of the periocular region and a second conformation of the face; and outputting the mapping to an augmented reality device of a user, wherein the augmented reality device inputs an observed first conformation of the user into the mapping and receives an output of a predicted second conformation of the user.

In a 29th aspect, the method of aspect 28, where in the second conformation of the face comprises a conformation of a lower face of the user.

In a 30th aspect, the method of any one of aspects 28-29, wherein the first conformation is encoded by periocular face parameters and the second conformation is encoded by at least one of lower face parameters or full face parameters.

In a 31st aspect, the method of aspect 30, wherein the periocular face parameters and the lower face parameters are part of a three-dimensional (3D) face model.

In a 32nd aspect, the method of aspect 31, wherein the 3D face model is a deformable linear model.

In a 33rd aspect, the method of any one of aspects 28-32, wherein the second plurality of images is acquired by at least one of: an outward-facing imaging system of a head-mounted device or a camera external to the outward-facing imaging system.

In a 34th aspect, the method of any one of aspects 28-33, further comprising accessing an audio stream corresponding to the first plurality of images, and wherein the second plurality of the images comprises visemes determined by identifying phonemes associated with the audio stream and accessing visemes associated with the identified phonemes.

In a 35th aspect, the method of any one of aspects 28-34, wherein the machine learning derived model comprises a likelihood that the conformation of the face matches the conformation of the periocular region.

In a 36th aspect, the method of any one of aspects 28-35, wherein the machine learning derived model is further trained using at least one of: an audio stream associated with the first plurality of images and the second plurality of images, or eye specific information.

In a 37th aspect, a method for generating a mapping from a first region of the face of a user to a second region of the face of the user, the method comprising: under control of a hardware computer system: accessing a first plurality of images associated with first conformations of the first region; determining a second plurality of images associated with second conformations of the second region, wherein each of the first conformations of the first region is associated with at least one of the second conformations of the second region; and training a machine learning derived model using the first plurality of images and the second plurality of images to generate a mapping from a first conformation of the first region and a second conformation of the second region.

In a 38th aspect, the method of aspect 37, wherein the first region is a periocular region and the second region is a full face or a lower face region.

In a 39th aspect, the method of aspect 37, wherein the first region is a full face or a lower face region and the second region is a periocular region.

In a 40th aspect, the method of aspect 38 or 39, wherein images of the full face and the lower face region are acquired by at least one of: an outward-facing imaging system of a head-mounted device or a camera external to the outward-facing imaging system.

In a 41st aspect, the method of any one of aspects 37-40, wherein the first region is observable by a head-mounted device while the second region is unobservable by the head-mounted device.

In a 42nd aspect, the method of any one of aspects 37-41, wherein the first conformation and the second conformation are encoded by face parameters.

In a 43rd aspect, the method of aspect 42, wherein the face parameters are part of a three-dimensional (3D) face model.

In a 44th aspect, the method of any one of aspects 37-43, wherein the machine learning derived model comprises a likelihood that the first conformation of the first region matches the second conformation of the second region.

In a 45th aspect, the method of any one of aspects 37-44, wherein the machine learning derived model is further trained using at least one of: an audio stream associated with the first plurality of images and the second plurality of images, or eye specific information.

In a 46th aspect, the method of any one of aspects 37-45, wherein the mapping comprises an input comprising conformation of a lower face of the user and an output comprising conformations of the periocular region.

In a 47th aspect, the method of aspect 46, further comprising communicating the mapping to a wearable device to generate an image of the periocular region based on an image of the lower face of the user.

In a 48th aspect, a system for generating a mapping from a first region of the face of a user to a second region of the face of the user, the system comprising a hardware processor configured to perform any one of the methods in aspects 28-47.

In a 49th aspect, a wearable system for animating a user's face during speech, the wearable system comprising: an inward-facing imaging system configured to image a periocular region of a user; an audio sensor configured to receive the user's speech; a hardware processor programmed to: acquire an image, via the inward-facing imaging system, of the periocular region of the user; generate, based at least partly on the image, periocular face parameters encoding a periocular conformation of at least the periocular region of the user; acquire, by the audio sensor, an audio stream spoken by the user; identify a phoneme in the audio stream; access a mapping wherein an input of the mapping comprises the phoneme and the image of the periocular region of the user and an output of the mapping comprises lower face parameters encoding a lower face conformation of at least the lower face of the user, wherein the lower face is unobserved by the inward-facing imaging system when worn by the user; and apply the mapping to the image to generate lower face parameters; combine the periocular face parameters and the lower face parameters to generate full face parameters associated with a three-dimensional (3D) face model; and generate an animation of the user's face based at least in part on the full face parameters.

In a 50th aspect, the wearable system of aspect 49, wherein the 3D face model comprises a deformable linear model and wherein the periocular face parameters and the lower face parameters describe a deformation of the face when the user is speaking.

In a 51st aspect, the wearable system of aspect 50, wherein to generate the full face parameters, the hardware processor is programmed to update the 3D face model to reflect an update to at least one of the lower face parameters or the periocular face parameters.

In a 52nd aspect, the wearable system of any one of aspects 49-51, wherein the input of the mapping further comprises at least one of eye specific information, a body movement, or a heart rate.

In a 53rd aspect, the wearable system of aspect 52, wherein the eye specific information comprises at least one of: an eye pose, a pupil dilation state, an eye color, or an eyelid state of the user.

In a 54th aspect, the wearable system of any one of aspects 49-53, wherein the lower face parameters encode visemes which visually describe phonemes in the audio stream.

In a 55th aspect, the wearable system of any one of aspects aspect 49-54, wherein the hardware processor is further programmed to infer a skin texture of the face of the user based at least partly on the image of the periocular region, wherein the animation of the user's face incorporates the skin texture of the face.

In a 56th aspect, the wearable system of any one of aspects 49-55, wherein the inward-facing imaging system comprises an eye camera and the image of the periocular region acquired by the inward-facing imaging system comprises an image of the periocular region for a first eye.

In a 57th aspect, the wearable system of aspect 56, wherein to generate the full face parameters, the hardware processor is programmed to: determine periocular face parameters for a second eye based on the image of the periocular region acquired by the inward-facing imaging system; and incorporate the periocular face parameters for the second eye into the full face parameters.

In a 58th aspect, the wearable system of any one of aspects 49-57, wherein to cause the full face parameters to be applied to generate the animation of the user's face, the hardware processor is programmed to communicate instructions to a wearable device comprising a mixed reality display wherein the instructions cause the full face parameters to be applied to vary the 3D face model from a neutral position.

In a 59th aspect, a method for animating a user's face during speech, the method comprising: accessing an image acquired by an inward-facing imaging system configured to image a periocular region of a user; determining, based at least partly on the images, periocular face parameters encoding a periocular conformation of at least the periocular region of the user; accessing an audio stream spoken by the user acquired by an audio sensor; identifying a phoneme in the audio stream; accessing a mapping wherein an input of the mapping comprises the phoneme and the image of the periocular region of the user and an output of the mapping comprises lower face parameters encoding a lower face conformation of at least the lower face of the user; applying the mapping to the image to generate lower face parameters; combining the periocular face parameters and the lower face parameters to generate full face parameters associated with a three-dimensional (3D) face model; and generating a full face image based at least partly on the full face parameters.

In a 60th aspect, the method of aspect 59, wherein the 3D face model comprises a deformable linear model and wherein the periocular face parameters and the lower face parameters describe a deformation of the face when the user is speaking.

In a 61st aspect, the method of aspect 60, wherein to generate the full face parameters, the hardware processor is programmed to update the 3D face model to reflect an update to at least one of the lower face parameters or the periocular face parameters.

In a 62nd aspect, the method of any one of aspects 59-61, wherein the full face parameters are combined with eye specific information to determine an animation associated with the user's face.

In a 63rd aspect, the method of aspect 62, wherein the eye specific information comprises at least one of: an eye pose, a pupil dilation state, an eye color, or an eyelid state of the user.

In a 64th aspect, the method of any one of aspects 59-63, wherein the lower face parameters encode visemes which visually describe phonemes in the audio stream.

In a 65th aspect, the method of any one of aspects 59-64, wherein the full face image further incorporates skin textures of the user which are determined based at least partly on the image acquired by the inward-facing imaging system.

In a 66th aspect, the method of any one of aspects 59-65, wherein the mapping comprises a likelihood that a periocular face parameter is associated with a lower face parameter, and the lower face parameters are selected to generate the full face image in response to a determination that they pass threshold criteria.

In a 67th aspect, the method of any one of aspects 59-66, wherein the image comprise at least one of a still image or a video frame.

In a 68th aspect, the method of any one of aspects 59-67, further comprising instructing a head-mounted display to render the full face image in a mixed reality environment.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable system for animating a user's face during speech, the wearable system comprising:
   an inward-facing imaging system configured to capture images, the inward-facing imaging system comprising one or more cameras positioned such that, when the wearable system is worn by the user, a periocular region of a user's face is observable by the inward-facing imaging system and the user's lower face is unobservable by the inward-facing imaging system;
   an audio sensor configured to receive the user's speech;
   a hardware processor programmed to:
      acquire an image, via the inward-facing imaging system when the wearable system is worn by the user, of the periocular region of the user;
      generate, based at least partly on the image of the periocular region of the user, periocular face parameters encoding a periocular conformation of at least the periocular region of the user;
      acquire, by the audio sensor, an audio stream spoken by the user;
      identify a phoneme in the audio stream;
      access a base model that was generated using images associated with a group of people not including the user;
      customize a mapping based at least in part on the base model and the image of the periocular region of the user,
         wherein an input of the mapping comprises the phoneme and the image of the periocular region of the user, and
         wherein an output of the mapping comprises lower face parameters that encode a conformation of the lower face of the user and that are deduced from an analysis of the phoneme and the image of the periocular region of the user;
      apply the mapping to the image of the periocular region of the user to generate the lower face parameters;
      combine the periocular face parameters and the lower face parameters to generate full face parameters associated with a three-dimensional (3D) face model; and
      generate an animation of the user's face based at least in part on the full face parameters.

2. The wearable system of claim 1, wherein the 3D face model comprises a deformable linear model and wherein the periocular face parameters and the lower face parameters describe a deformation of the face when the user is speaking.

3. The wearable system of claim 2, wherein to generate the full face parameters, the hardware processor is programmed to update the 3D face model to reflect an update to at least one of the lower face parameters or the periocular face parameters.

4. The wearable system of claim 1, wherein the input of the mapping further comprises at least one of eye specific information, a body movement, or a heart rate.

5. The wearable system of claim 4, wherein the eye specific information comprises at least one of: an eye pose, a pupil dilation state, an eye color, or an eyelid state of the user.

6. The wearable system of claim 1, wherein the lower face parameters encode visemes which visually describe phonemes in the audio stream.

7. The wearable system of claim 1, wherein to customize the mapping, the hardware processor is programmed to infer a skin texture of the face of the user based at least partly on the image of the periocular region, wherein the animation of the user's face incorporates the skin texture of the face.

8. The wearable system of claim 1, wherein the inward-facing imaging system comprises an eye camera and the image of the periocular region acquired by the inward-facing imaging system comprises an image of the periocular region for a first eye.

9. The wearable system of claim 8, wherein to generate the full face parameters, the hardware processor is programmed to:
determine periocular face parameters for a second eye based on the image of the periocular region acquired by the inward-facing imaging system; and
incorporate the periocular face parameters for the second eye into the full face parameters.

10. The wearable system of claim 1, wherein to cause the full face parameters to be applied to generate the animation of the user's face, the hardware processor is programmed to communicate instructions to a wearable device comprising a mixed reality display wherein the instructions cause the full face parameters to be applied to vary the 3D face model from a neutral position.

11. The wearable system of claim 1, wherein the base model comprises a 3D deformable linear model generated based on images of the group of people.

12. The wearable system of claim 1, wherein the lower face of the user is unobserved by any camera associated with the wearable system when the wearable system is worn by the user.

13. A method for animating a user's face during speech, the method comprising:
accessing an image of the periocular region of a user acquired by an inward-facing imaging system configured to capture images, the inward-facing imaging system comprising one or more cameras positioned such that, when the wearable system is worn by the user, a periocular region of the user's face is observable by the inward-facing imaging system and the user's lower face is unobservable by the inward-facing imaging system;
determining, based at least partly on the images, periocular face parameters encoding a periocular conformation of at least the periocular region of the user;
accessing an audio stream spoken by the user acquired by an audio sensor;
identifying a phoneme in the audio stream;
accessing a base model that was generated using images associated with a group of people not including the user;
customizing a mapping based at least in part on the base model and the image of the periocular region of the user,
wherein an input of the mapping comprises the phoneme and the image of the periocular region of the user, and
wherein an output of the mapping comprises lower face parameters that encode a conformation of the lower face of the user, and that are deduced from an analysis of the phoneme and the image of the periocular region of the user;
applying the mapping to the image to generate the lower face parameters;
combining the periocular face parameters and the lower face parameters to generate full face parameters associated with a three-dimensional (3D) face model; and
generating a full face image based at least partly on the full face parameters.

14. The method of claim 13, wherein the 3D face model comprises a deformable linear model and wherein the periocular face parameters and the lower face parameters describe a deformation of the face when the user is speaking.

15. The method of claim 14, wherein to generate the full face parameters, the hardware processor is programmed to update the 3D face model to reflect an update to at least one of the lower face parameters or the periocular face parameters.

16. The method of claim 13, wherein the full face parameters are combined with eye specific information to determine an animation associated with the user's face.

17. The method of claim 16, wherein the eye specific information comprises at least one of: an eye pose, a pupil dilation state, an eye color, or an eyelid state of the user.

18. The method of claim 13, wherein the lower face parameters encode visemes which visually describe phonemes in the audio stream.

19. The method of claim 13, wherein the full face image further incorporates skin textures of the user which are determined based at least partly on the image acquired by the inward-facing imaging system.

20. The method of claim 13, wherein the mapping comprises a likelihood that a periocular face parameter is associated with a lower face parameter, and the lower face parameters are selected to generate the full face image in response to a determination that they pass threshold criteria.

21. The method of claim 13, wherein the image comprise at least one of a still image or a video frame.

22. The method of claim 13, further comprising instructing a head-mounted display to render the full face image in a mixed reality environment.

23. The method of claim 13, wherein the base model comprises a 3D deformable linear model generated based on images of the group of people.

* * * * *